(12) United States Patent
Elias

(10) Patent No.: US 7,796,565 B2
(45) Date of Patent: Sep. 14, 2010

(54) MIXED VOICE AND SPREAD SPECTRUM DATA SIGNALING WITH MULTIPLEXING MULTIPLE USERS WITH CDMA

(75) Inventor: Eric David Elias, Somerville, MA (US)

(73) Assignee: Polycom, Inc., Pleasanton, CA (US)

( * ) Notice: Subject to any disclaimer, the term of this patent is extended or adjusted under 35 U.S.C. 154(b) by 780 days.

(21) Appl. No.: 11/536,546

(22) Filed: Sep. 28, 2006

(65) Prior Publication Data
US 2007/0047626 A1 Mar. 1, 2007

Related U.S. Application Data

(63) Continuation-in-part of application No. 11/148,087, filed on Jun. 8, 2005.

(51) Int. Cl.
*H04B 7/216* (2006.01)
(52) U.S. Cl. .................. 370/335; 370/342; 375/130
(58) Field of Classification Search ........... 370/335, 370/342, 441, 493–495, 527–529; 375/130, 375/135, 136; 455/450, 509
See application file for complete search history.

(56) References Cited

U.S. PATENT DOCUMENTS

| | | | |
|---|---|---|---|
| 3,573,377 A | 4/1971 | Lincroft | |
| 3,612,767 A | 10/1971 | Anderson et al. | |
| 3,649,761 A | 3/1972 | Bush | |
| 3,854,010 A | 12/1974 | Yoshino et al. | |
| 3,927,269 A | 12/1975 | Yoshino et al. | |
| 4,058,769 A | 11/1977 | Alderman | |
| 4,257,119 A | 3/1981 | Pitroda | |
| 4,311,877 A | 1/1982 | Kahn | |
| 4,351,062 A | 9/1982 | Yoshiya | |
| 4,384,362 A | 5/1983 | Leland | |

(Continued)

FOREIGN PATENT DOCUMENTS

EP 0 669 749 8/1995

(Continued)

OTHER PUBLICATIONS

International Search Report received in corresponding International Application No. PCT/US02/41778 dated Jul. 17, 2003.

(Continued)

*Primary Examiner*—Sharad Rampuria
(74) *Attorney, Agent, or Firm*—Wong, Cabello, Lutsch, Rutherford & Brucculeri LLP

(57) ABSTRACT

Systems, methods, and devices for mixed voice and spread spectrum data signaling with spread spectrum data hiding with CDMA (Code Division Multiple Access) for three or more users. The disclosed systems, methods, and devices may be implemented in audio conferencing or video conferencing. Various embodiments of the present disclosure provide a data and voice mixer, which includes an improved spread spectrum data hiding transmitter. The transmitter may comprise a CDMA chip sequence generator and a spreading encoder. Different users may be accommodated by selecting different initializations for the registers of the CDMA chip sequence generator. Different spreading code may be used for different users which are near orthogonal to each other. In some embodiments, the CDMA chip sequence generator pseudo-randomly selects the chip sequence from one of a plurality of Gold chip sequence generators.

29 Claims, 13 Drawing Sheets

U.S. PATENT DOCUMENTS

| | | | |
|---|---|---|---|
| 4,425,642 A | 1/1984 | Moses et al. | |
| 4,544,804 A | 10/1985 | Herr et al. | |
| 4,763,317 A | 8/1988 | Lehman et al. | |
| 4,782,521 A | 11/1988 | Bartlett | |
| 4,796,293 A | 1/1989 | Blinken et al. | |
| 4,901,307 A * | 2/1990 | Gilhousen et al. | 370/320 |
| 4,945,412 A | 7/1990 | Kramer | |
| 4,995,071 A | 2/1991 | Weber et al. | |
| 5,003,593 A | 3/1991 | Mihm, Jr. | |
| 5,195,087 A | 3/1993 | Bennett et al. | |
| 5,260,967 A * | 11/1993 | Schilling | 370/342 |
| 5,353,373 A | 10/1994 | Drogo de Iacovo et al. | |
| 5,377,226 A * | 12/1994 | Davis | 370/342 |
| 5,438,596 A * | 8/1995 | Sugita | 375/140 |
| 5,473,631 A | 12/1995 | Moses | |
| 5,526,354 A | 6/1996 | Barraclough et al. | |
| 5,530,699 A | 6/1996 | Kline | |
| 5,572,247 A | 11/1996 | Montgomery et al. | |
| 5,583,963 A | 12/1996 | Lozach | |
| 5,598,429 A * | 1/1997 | Marshall | 375/149 |
| 5,625,407 A | 4/1997 | Biggs et al. | |
| 5,675,581 A * | 10/1997 | Soliman | 370/252 |
| 5,677,728 A | 10/1997 | Schoolman | |
| 5,687,095 A | 11/1997 | Haskell et al. | |
| 5,724,383 A * | 3/1998 | Gold et al. | 375/141 |
| 5,724,416 A | 3/1998 | Foladare et al. | |
| 5,737,329 A * | 4/1998 | Horiguchi | 370/342 |
| 5,758,079 A | 5/1998 | Ludwig | |
| 5,761,239 A * | 6/1998 | Gold et al. | 375/150 |
| 5,761,292 A | 6/1998 | Wagner et al. | |
| 5,790,591 A * | 8/1998 | Gold et al. | 375/142 |
| 5,818,866 A * | 10/1998 | Wilk | 375/149 |
| 5,835,129 A | 11/1998 | Kumar | |
| 5,841,763 A | 11/1998 | Leondires et al. | |
| 5,844,600 A | 12/1998 | Kerr | |
| 5,855,502 A | 1/1999 | Truchsess | |
| 5,886,734 A | 3/1999 | Ozone et al. | |
| 5,894,321 A | 4/1999 | Downs et al. | |
| 5,914,940 A | 6/1999 | Fukuoka et al. | |
| 5,916,302 A | 6/1999 | Dunn et al. | |
| 5,943,322 A * | 8/1999 | Mayor et al. | 370/280 |
| 5,983,192 A | 11/1999 | Botzko et al. | |
| 5,983,261 A | 11/1999 | Riddle | |
| 5,991,385 A | 11/1999 | Dunn et al. | |
| 5,999,207 A | 12/1999 | Rodrigues et al. | |
| 5,999,996 A | 12/1999 | McDougall et al. | |
| 6,049,531 A | 4/2000 | Roy | |
| 6,088,347 A * | 7/2000 | Minn et al. | 370/342 |
| 6,088,368 A | 7/2000 | Rubinstain et al. | |
| 6,108,327 A * | 8/2000 | Schilling et al. | 370/342 |
| 6,111,936 A | 8/2000 | Bremer | |
| 6,130,880 A | 10/2000 | Naudus et al. | |
| 6,134,223 A | 10/2000 | Burke et al. | |
| 6,151,578 A | 11/2000 | Bourcet et al. | |
| 6,154,524 A | 11/2000 | Bremer | |
| 6,170,011 B1 | 1/2001 | Macleod Beck et al. | |
| 6,178,237 B1 | 1/2001 | Horn | |
| 6,185,285 B1 | 2/2001 | Reivea et al. | |
| 6,192,395 B1 | 2/2001 | Lerner | |
| 6,202,084 B1 | 3/2001 | Kumar et al. | |
| 6,208,372 B1 | 3/2001 | Barraclough | |
| 6,230,197 B1 | 5/2001 | Beck et al. | |
| 6,249,517 B1 * | 6/2001 | Roh et al. | 370/342 |
| 6,272,176 B1 | 8/2001 | Srinivasan | |
| 6,314,126 B1 * | 11/2001 | Schilling et al. | 375/130 |
| 6,327,567 B1 | 12/2001 | Willehadson et al. | |
| 6,345,047 B1 | 2/2002 | Regnier | |
| RE37,802 E * | 7/2002 | Fattouche et al. | 375/141 |
| 6,421,355 B1 | 7/2002 | Quiring et al. | |
| 6,442,190 B1 * | 8/2002 | Nguyen | 375/141 |
| 6,453,022 B1 | 9/2002 | Weinman, Jr. | |
| 6,453,336 B1 | 9/2002 | Beyda et al. | |
| 6,501,739 B1 | 12/2002 | Cohen | |
| 6,501,740 B1 | 12/2002 | Sun et al. | |
| 6,526,385 B1 | 2/2003 | Kobayashi et al. | |
| 6,580,789 B1 | 6/2003 | Simpson et al. | |
| 6,584,138 B1 | 6/2003 | Neubauer et al. | |
| 6,597,667 B1 | 7/2003 | Cerna | |
| 6,628,644 B1 | 9/2003 | Nelson et al. | |
| 6,628,768 B1 | 9/2003 | Ramaswamy et al. | |
| 6,661,833 B1 * | 12/2003 | Black et al. | 375/147 |
| 6,671,263 B1 | 12/2003 | Potter et al. | |
| 6,728,222 B1 | 4/2004 | Ono | |
| 6,728,367 B1 | 4/2004 | Swam | |
| 6,731,609 B1 | 5/2004 | Hirni et al. | |
| RE38,523 E * | 6/2004 | Ozluturk | 375/367 |
| 6,765,895 B1 * | 7/2004 | Watanabe | 370/335 |
| 6,782,035 B1 * | 8/2004 | Nakamura et al. | 375/130 |
| 6,792,092 B1 | 9/2004 | Michalewicz | |
| 6,798,753 B1 | 9/2004 | Doganata et al. | |
| 6,810,116 B1 | 10/2004 | Sorensen et al. | |
| 6,812,955 B2 | 11/2004 | Takaki et al. | |
| 6,885,652 B1 * | 4/2005 | Ozukturk et al. | 370/342 |
| 6,888,935 B1 | 5/2005 | Day | |
| 6,898,620 B1 | 5/2005 | Ludwig et al. | |
| 6,940,826 B1 | 9/2005 | Simard et al. | |
| 7,003,042 B2 * | 2/2006 | Morelos-Zaragoza et al. | 375/253 |
| 7,006,456 B2 | 2/2006 | Rabipour et al. | |
| 7,006,616 B1 | 2/2006 | Christofferson et al. | |
| 7,107,312 B2 | 9/2006 | Hackbarth et al. | |
| 7,185,054 B1 | 2/2007 | Ludwig et al. | |
| 7,221,663 B2 | 5/2007 | Rodman et al. | |
| 7,227,938 B2 | 6/2007 | Rodman et al. | |
| 7,230,974 B1 * | 6/2007 | Lu et al. | 375/145 |
| 7,302,050 B1 | 11/2007 | Michaelewicz | |
| 7,339,605 B2 | 3/2008 | Rodman et al. | |
| 7,386,026 B1 * | 6/2008 | Gold | 375/130 |
| 7,415,548 B2 * | 8/2008 | Mahany et al. | 710/18 |
| 7,428,223 B2 | 9/2008 | Nierhaus et al. | |
| 7,460,991 B2 * | 12/2008 | Jones et al. | 704/211 |
| 7,526,078 B2 | 4/2009 | Rodman et al. | |
| 2001/0008556 A1 | 7/2001 | Bauer et al. | |
| 2001/0016038 A1 | 8/2001 | Sammon et al. | |
| 2001/0033613 A1 | 10/2001 | Vitenberg | |
| 2001/0043571 A1 | 11/2001 | Jank et al. | |
| 2002/0018117 A1 * | 2/2002 | Tosaya | 348/14.08 |
| 2002/0034166 A1 | 3/2002 | Barany et al. | |
| 2002/0083462 A1 | 6/2002 | Arnott | |
| 2002/0093985 A1 | 7/2002 | Nimmagadda | |
| 2002/0097679 A1 | 7/2002 | Berenbaum | |
| 2002/0122429 A1 | 9/2002 | Griggs | |
| 2002/0131377 A1 | 9/2002 | DeJaco et al. | |
| 2002/0151294 A1 | 10/2002 | Kirby et al. | |
| 2003/0016676 A1 | 1/2003 | Allen et al. | |
| 2003/0048353 A1 | 3/2003 | Kenoyer et al. | |
| 2003/0053443 A1 | 3/2003 | Owens | |
| 2003/0072429 A1 | 4/2003 | Slobodin et al. | |
| 2003/0112947 A1 | 6/2003 | Cohen | |
| 2003/0114122 A1 * | 6/2003 | Strakovsky | 455/92 |
| 2003/0123645 A1 | 7/2003 | Comisky | |
| 2003/0142635 A1 * | 7/2003 | Roher et al. | 370/260 |
| 2003/0179859 A1 | 9/2003 | Chea et al. | |
| 2004/0003045 A1 | 1/2004 | Tucker et al. | |
| 2004/0012669 A1 | 1/2004 | Drell et al. | |
| 2004/0022272 A1 * | 2/2004 | Rodman et al. | 370/494 |
| 2004/0125932 A1 | 7/2004 | Orbach et al. | |
| 2004/0213474 A1 | 10/2004 | Kato | |
| 2005/0014491 A1 | 1/2005 | Johnson | |
| 2005/0018756 A1 * | 1/2005 | Nuytkens et al. | 375/146 |
| 2005/0157777 A1 * | 7/2005 | Mizuno | 375/150 |
| 2005/0185602 A1 | 8/2005 | Simard et al. | |
| 2005/0212908 A1 | 9/2005 | Rodman et al. | |
| 2005/0213517 A1 | 9/2005 | Rodman et al. | |

| | | | |
|---|---|---|---|
| 2005/0213725 | A1 | 9/2005 | Rodman |
| 2005/0213726 | A1 | 9/2005 | Rodman et al. |
| 2005/0213728 | A1 | 9/2005 | Rodman et al. |
| 2005/0213729 | A1 | 9/2005 | Rodman et al. |
| 2005/0213730 | A1 | 9/2005 | Rodman et al. |
| 2005/0213731 | A1 | 9/2005 | Rodman et al. |
| 2005/0213732 | A1 | 9/2005 | Rodman |
| 2005/0213733 | A1 | 9/2005 | Rodman et al. |
| 2005/0213734 | A1 | 9/2005 | Rodman et al. |
| 2005/0213735 | A1 | 9/2005 | Rodman et al. |
| 2005/0213736 | A1 | 9/2005 | Rodman et al. |
| 2005/0213737 | A1 | 9/2005 | Rodman et al. |
| 2005/0213738 | A1 | 9/2005 | Rodman et al. |
| 2005/0213739 | A1* | 9/2005 | Rodman et al. ........ 379/202.01 |
| 2005/0232166 | A1* | 10/2005 | Nierhaus .................... 370/260 |
| 2005/0254558 | A1* | 11/2005 | Dutka ........................ 375/149 |
| 2005/0281319 | A1* | 12/2005 | Schilling .................... 375/135 |
| 2006/0098692 | A1 | 5/2006 | D'Angelo |
| 2006/0109890 | A1* | 5/2006 | Willenegger ................ 375/146 |
| 2006/0222155 | A1 | 10/2006 | Summers et al. |
| 2008/0144701 | A1* | 6/2008 | Gold .......................... 375/132 |
| 2009/0132391 | A1* | 5/2009 | Jacobs ........................ 705/27 |

FOREIGN PATENT DOCUMENTS

| | | |
|---|---|---|
| EP | 0 680 190 | 11/1995 |
| EP | 1 006 706 | 7/2003 |
| JP | 05300509 | 12/1993 |
| JP | 08125738 | 5/1996 |
| JP | 10042264 | 2/1998 |
| RU | 2 096 921 | 11/1997 |
| WO | 94/18779 | 8/1994 |
| WO | 98/19458 | 5/1998 |
| WO | 99/12351 | 3/1999 |

OTHER PUBLICATIONS

Search Report received in corresponding European Application No. 03743750.6-2414-PCT/US0306698 dated Mar. 16, 2005.

Search Report received in corresponding European Application No. 03726026.2-2414-US0306736 dated Mar. 10, 2005.

International Search Report received in corresponding International Application No. PCT/US01/51636 dated Sep. 26, 2001.

Mermeistein P.; "G.722, A New CCITT Coding Standard for Digital Transmission of Wideband Audio Signals;" IEEE Communications Magazine; 26(1) Jan. 1988; pp. 8-15.

Mermeistein; "G.722, A New CCIT Coding Standard for Digital Transmission of Wideband Audio Signals;" IEEE Communications Magazine; Jan. 1988—vol. 26, No. 1.

Schulzrinne; "Voice Communication Across the Internet: A Network Voice Terminal;" 1992, pp. 1-34, Amherst, MA.

Haojun; "Implementing an Audio Multipoint Processor on DSP Array;" 2001, pp. 441-444.

Jung; "The Multimedia Desktop Conference System Adaptability in Network Traffic on LAN;" 1995; pp. 334-338, IEEE.

Noore; "Computer-Based Multimedia Video Conferencing System;" 1993; pp. 587-591.

Sasse; "Workstation-Based Multimedia Conferencing: Experiences from the MICE Project;" 1994; pp. 1-6.

User's Guide Adminstrator's guide, SoundStation(R) VTX 1000 Operation Manual, (c)2003 Polycom, Inc.

Quick Installation Guide, Vortex(R)—Soundstation VTX 1000TM, (c)2004, Polycom, Inc.

J. Rodman, Polycom(R), White Paper—"The Power of Shared Resources: Conference Room Integration in the VTX/VSX Environment" Jun. 2, 2004, pp. 1-6.

J. Rodman, Polycom(R), White Paper—"The Distributed Dawn: the Emergence of Versatile Performance in the Conferencing Environment" Jun. 2, 2004, pp. 1-7.

H324 Videophones Standard; http://www.elextronika.com/tvphone/h324.htm; Retrieved Mar. 14, 2005; 4 pages.

International Telecommunication Union; ITU-T Telecommunication Standardization Sector of ITU H.234 (Mar. 2002) Series H: Audiovisual and Multimedia Systems Infrastructure of Audiovisual services—Systems and terminal equipment for audiovisual services Terminal for low bit-rate multimedia Communication; ITU-T Recommendation H.324.

MultiTech(R) Systems; MultiModernDSVD Compact DSVD Modems; http://www.multitech.com/Products/Families/MultiModernDSVD; obtained Mar. 14, 2005.

DSVD and H324 Standards; TechOnLine—Modern and Fax Standards and Software; http://www.techonline.com/community/ed_resource/feature_article/20041; Obtained Mar. 24, 2005.

Hering, et al.; "Safety and Security Increases for Air Traffic Management Through Unnoticeable Watermark Aircraft Identification Tag Transmitted with VHF Voice Communication" pp. 1-10; © 2003 IEEE.

CDMA Overview, Resources/Tutorials; http://www.telecomspace.com/cdma.html; Retrieved Sep. 24, 2006; 5 pages.

Spread spectrum—Wikipedia, the free encyclopedia; http://en.wikipedia.org/wiki/Spread_spectrum; retrieved Sep. 24, 2006; 4 pages.

Search Report received in corresponding European Application No. EP 02 72 8007 dated Sep. 26, 2006.

* cited by examiner

US 7,796,565 B2

MIXED VOICE AND SPREAD SPECTRUM DATA SIGNALING WITH MULTIPLEXING MULTIPLE USERS WITH CDMA

CROSS-REFERENCE TO RELATED APPLICATIONS

This application is a continuation-in-part of co-pending Ser. No. 11/148,087 filed on Jun. 8, 2005 entitled "Voice Interference Correction for Mixed Voice and Spread Spectrum Data Signaling." The benefit of priority of 35 U.S.C. §120 is hereby claimed. The contents of the referenced application are hereby incorporated by reference.

This application is related to Ser. No. 11/536,546 filed on even date herewith entitled "Mixed Voice and Spread Spectrum Data Signaling with Enhanced Concealment of Data." The contents of the referenced application are hereby incorporated by reference.

This application is also related to the following co-pending applications, all of which are commonly assigned and were filed on Mar. 15, 2005: Ser. No. 11/081,081 entitled "Conference Endpoint Controlling Functions of a Remote Device"; Ser. No. 11/080,369, entitled "Conference Endpoint Controlling Audio Volume of a Remote Device"; Ser. No. 11/080,989, entitled "Conference Endpoint Instructing Conference Bridge to Dial Phone Number"; Ser. No. 11/080,993, entitled "Conference Endpoint Instructing Conference Bridge to Mute Participants"; Ser. No. 11/080,985, entitled "Conference Endpoint Instructing a Remote Device to Establish a New Connection"; Ser. No. 11/081,019, entitled "Conference Endpoint Requesting and Receiving Billing Information from a Conference Bridge"; Ser. No. 11/080,997, entitled "Speakerphone Transmitting URL Information to a Remote Device"; Ser. No. 11/080,988, entitled "Speakerphone Using a Secure Audio Connection to Initiate a Second Secure Connection"; Ser. No. 11/080,984, entitled "Speakerphone and Conference Bridge which Request and Perform Polling Operations"; Ser. No. 11/081,016, entitled "Speakerphone Transmitting Password Information to a Remote Device"; Ser. No. 11/080,995, entitled "Speakerphone and Conference Bridge which Receive and Provide Participant Monitoring Information"; Ser. No. 11/080,999, entitled "Speakerphone Establishing and Using a Second Connection of Graphics Information"; Ser. No. 11/080,994, entitled "Conference Bridge Which Decodes and Responds to Control Information Embedded in Audio Information"; Ser. No. 11/080,996, entitled "Conference Bridge Which Detects Control Information Embedded in Audio Information to Prioritize Operations"; Ser. No. 11/080,978, entitled "Conference Bridge Which Transfers Control Information Embedded in Audio Information Between Endpoints"; and Ser. No. 11/080,977, entitled "Speakerphone Transmitting Control Information Embedded in Audio Information Through a Conference Bridge." The contents of the aforementioned applications are hereby incorporated by reference.

BACKGROUND OF THE INVENTION

1. Field of the Invention

Without limiting the scope of the invention, the present invention relates generally to embedding digital data in an analog signal, and more particularly, to systems, methods, and devices for spread spectrum data hiding with multiple channels of hidden data for multiple users.

2. Description of the Related Art

During a phone call, a participant may desire to not only transmit voice but to also supplement the voice with data content. An audio system which can transmit additional data has many different uses. For example, such additional data may be related to an ongoing teleconference (referred to herein as conference). For example, the data may be related to an ongoing audio conference or video conference.

The data is digital, while the voice is analog. There are a number of ways to combine digital data and voice signals together. For example, one way is to use digital telephone channels such as an internet link or ISDN-based channels. The digital data can be multiplexed with digitized voice. This method is limited, however, to channels that are digital end-to-end.

Another way to combine digital data and voice signals is to use a modem technology such as V.34 or V.92. This will also provide a digital channel for multiplexing digital data with digitized voice. The base channel can be analog. A drawback exists, however, in that the modem loses periods of audio, for example, while the modem trains and during bit errors and retrains. Moreover, the modem solution only works point-to-point and only works with compatible systems.

Yet another way is to use spread spectrum modulation of the data over the full phone line bandwidth. Energy at a frequency is spread over a wide range of frequencies for transmission, and the spread spectrum signals are collected onto their original frequency at the receiver. Spread spectrum techniques use noise-like carrier waves which are generally regarded as difficult to detect and demodulate. It is a challenge to balance restraining the audibility of the modulated data and assuring the reliability of its decoding.

BRIEF SUMMARY OF THE INVENTION

Various embodiments of the present disclosure provide systems, methods, and devices for spread spectrum data hiding with CDMA (Code Division Multiple Access) in a communication network of three or more users.

In accordance with various embodiments of the present disclosure, methods of exchanging analog signals and a digital data among at least two transmitters and at least one receiver are provided. The methods may include a first transmitter's generating a first CDMA chip sequence; combining a first digital bit stream and the first CDMA chip sequence, to form a first spread spectrum sequence; modulating the first spread spectrum sequence onto a first analog signal, to form a first modulated signal; and transmitting the first modulated signal to the receiver via a first communication channel. The methods may also include a second transmitter's generating a second CDMA chip sequence; combining a second digital bit stream and the second CDMA chip sequence, to form a second spread spectrum sequence; modulating the second spread spectrum sequence onto a second analog signal, to form a second modulated signal; and transmitting the second modulated signal to the receiver via a second communication channel. The first CDMA chip sequence is different from the second CDMA chip sequence. The CDMA chip sequence may be periodically pseudo-randomly selected from one of a plurality of chip sequence generators, such as Gold chip sequence generators.

In accordance with various embodiments of the present disclosure, methods of reconstructing a plurality of digital bit streams from an analog signal received via a communication channel are provided. The methods may include a demodulating a received signal, to produce a demodulated signal; generating a first CDMA chip sequence; generating a second CDMA chip sequence; multiplying the demodulated signal by the first CDMA chip sequence, to reconstruct a first digital bit stream; and multiplying the demodulated signal by the second CDMA chip sequence, to reconstruct a second digital bit stream. The first CDMA chip sequence is different from the second CDMA chip sequence. The CDMA chip sequence may be periodically pseudo-randomly selected from one of a plurality of chip sequence generators, such as Gold chip sequence generators.

In accordance with various embodiments of the present disclosure, methods for exchanging digital data embedded in analog signals among a plurality of transmitters and at least one receiver are provided. The methods may include, at a first end: generating a first CDMA chip sequence; combining a first digital bit stream and the first CDMA chip sequence, to form a first spread spectrum sequence; modulating the first spread spectrum sequence onto a first analog signal, to form a first modulated signal; and transmitting the first modulated signal to a bridge via a first communication channel. The methods may further include, at a second end: generating a second CDMA chip sequence; combining a second digital bit stream and the second CDMA chip sequence, to form a second spread spectrum sequence; modulating the second spread spectrum sequence onto a second analog signal, to form a second modulated signal; and transmitting the second modulated signal to the bridge via a second communication channel. The methods may also include, at a third end: demodulating a signal received from the bridge, to produce a demodulated signal; generating a third CDMA chip sequence; generating a fourth CDMA chip sequence; multiplying the demodulated signal by the third CDMA chip sequence, to reconstruct the first digital bit stream; and multiplying the demodulated signal by the fourth CDMA chip sequence, to reconstruct the second digital bit stream. The first CDMA chip sequence is different from the second CDMA chip sequence, and the third CDMA chip sequence is different from the fourth CDMA chip sequence.

Various embodiments of the present disclosure also provide a conferencing endpoint, including at least one signal source and at least one signal sink. The endpoint may further include a signal and data mixer, comprising a first CDMA chip sequence generator operable to generate a first CDMA chip sequence; a spreading encoder operable to combine a digital bit stream and the first CDMA chip sequence, to form a first spread spectrum sequence; and a modulator operable to modulate the spread spectrum sequence onto an analog signal received from the at least one signal source, to form a modulated signal for transmission via a communication channel. The endpoint may further include a signal and data separator, comprising a demodulator operable to demodulate a signal received via the communication channel, to produce a demodulated signal; a second CDMA chip sequence generator, operable to generate a second CDMA chip sequence; a third CDMA chip sequence generator, operable to generate a third CDMA chip sequence; a first spreading decoder operable to multiply the demodulated signal by the second CDMA chip sequence, to reconstruct a first digital bit stream; and a second spreading decoder operable to multiply the demodulated signal by the third CDMA chip sequence, to reconstruct a second digital bit stream. The second CDMA chip sequence is different from the third CDMA chip sequence. The signal source may include a microphone or a video camera or both. The signal sink may include a speaker or a display device or both.

Various embodiments of the present disclosure further provide a conferencing system wherein digital data and analog signals such as audio and video may be exchanged among at least three geographically remote endpoints. One of the endpoints may include a first signal source and a first signal and data mixer. The first signal and data mixer may include a first CDMA chip sequence generator operable to generate a first CDMA chip sequence; a first spreading encoder operable to combine the first CDMA chip sequence and a first digital bit stream provided by a first data source, to form a first spread spectrum sequence; and a first modulator operable to modulate the first spread spectrum sequence onto a first analog signal received from the first signal source, to form a first modulated signal for transmission to a conference bridge via a first communication channel. Another of the endpoints may include a second signal source and a second signal and data mixer. The second signal and data mixer may include a second CDMA chip sequence generator operable to generate a second CDMA chip sequence; a second spreading encoder operable to combine the second CDMA chip sequence and a second digital bit stream provided by a second data source, to form a second spread spectrum sequence; and a second modulator operable to modulate the second spread spectrum sequence onto a second analog signal received from the second signal source, to form a second modulated signal for transmission to the conference bridge via a second communication channel. Another of the endpoints may include at least one signal sink and a signal and data separator. The signal and data separator may include a demodulator operable to demodulate a signal received from the bridge via a third communication channel, to produce a demodulated signal; a third CDMA chip sequence generator, operable to generate a third CDMA chip sequence; a fourth CDMA chip sequence generator, operable to generate a fourth CDMA chip sequence; a first spreading decoder operable to multiply the demodulated signal by the third CDMA chip sequence; and a second spreading decoder operable to multiply the demodulated signal by the fourth CDMA chip sequence, to reconstruct the second digital bit stream. The third CDMA chip sequence is different from the fourth CDMA chip sequence. The signal sources may include microphones, video cameras, or both. The signal sinks may include speakers, display devices, or both.

In accordance with various embodiments of the present disclosure, a machine-readable medium may have embodied thereon a program which is executable by a machine to perform a method described herein.

BRIEF DESCRIPTION OF THE SEVERAL VIEWS OF THE DRAWINGS

A better understanding of the invention can be had when the following detailed description of the preferred embodiments is considered in conjunction with the following drawings, in which.

DETAILED DESCRIPTION OF THE INVENTION

In various applications, such as audio conferencing or video conferencing, several users from different locations may wish to connect and share data. Various embodiments of the present invention provide systems, methods, and devices for spread spectrum data hiding with CDMA for three or more users. Data hiding allows digital information to be concealed within a cover media such as, for example, audio, video, or images.

It is found that one way to lower perceptibility of the noise associated with the additional data in an audio signal is to use spread spectrum techniques. The spread spectrum method is generally regarded as robust against jamming and interference. It can be hidden and masked due to the low amplitude at any given frequency, and it is robust such that even if many channels are impaired, the overall signal can still go through. The spread spectrum can naturally support multi-user implementation; for example, it is used in the CDMA cellular telephone system.

Figure 1:
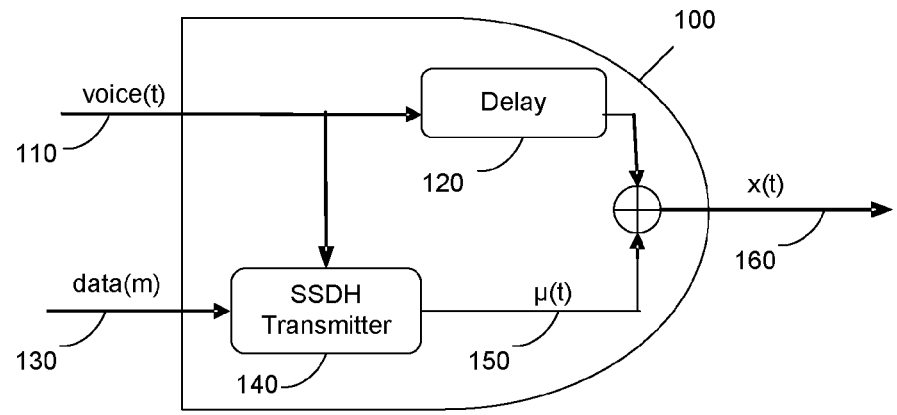
FIG. 1 depicts a block diagram of an exemplary data and voice mixer in accordance with various embodiments of the present disclosure.

In accordance with various embodiments of the present disclosure, spread spectrum data hiding (SSDH) is provided wherein modulated data is added to an analog voice signal with the modulated data generated by a spread spectrum modem. A block diagram of an exemplary data and voice mixer 100 is depicted in FIG. 1. A voice signal 110 to be transmitted is denoted by voice(t), wherein t represents continuous time. A delay unit 120 may be included to align the voice signal 110 for proper cancellation. The delay may be a function of implementation.

The binary sequence 130 to be transmitted is denoted by data(m), wherein m represents raw data bit time. The binary sequence 130 is fed into an SSDH transmitter 140. Various embodiments of the SSDH transmitter 140 are described below in more detail. The output of the SSDH transmitter 140 is a modulated distortion signal 150, $\mu(t)$. The distortion to the audio may be kept just below humanly perceptible levels. The data contained within $\mu(t)$ is recoverable on the receiving side by a voice and data separator. The recovery of the data may be regarded as robust to the interference of the voice(t) signal and the impairments imposed by the telephone channel.

The modulated distortion signal 150 may be added with the output of the delay unit 120 to produce a transmitter signal 160 denoted as x(t). The transmitter signal 160 may be used as an input to, for example, a telephone channel or other communication channel.

Figure 2A:
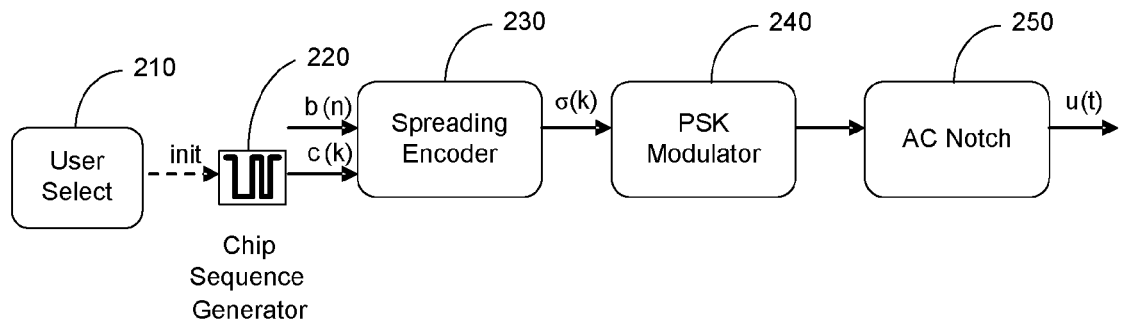
FIG. 2A depicts a block diagram of an exemplary SSDH transmitter in accordance with one embodiment of the present disclosure.
Figure 2B:
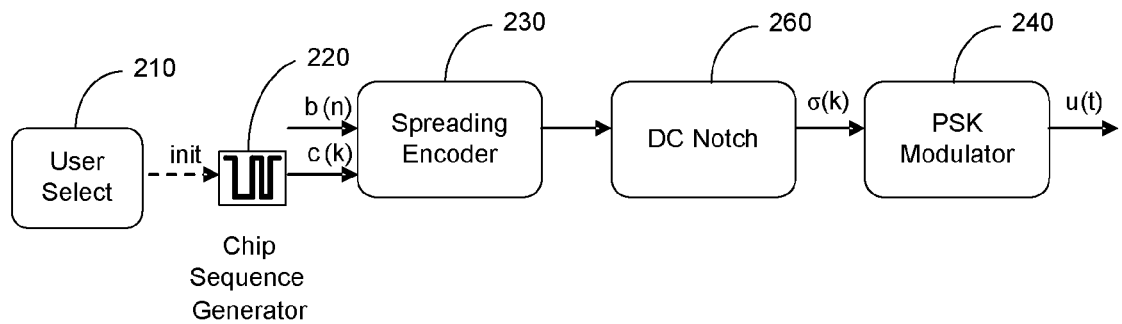
FIG. 2B depicts a block diagram of an exemplary SSDH transmitter in accordance with another embodiment of the present disclosure.

Reference is now made to FIG. 2A which depicts a block diagram of an exemplary SSDH transmitter in accordance with one embodiment of the present disclosure. The SSDH transmitter may comprise a chip sequence generator 220 which generates a periodic chip pattern c(k). A user select 210 may provide one or more initial values for the linear feedback shift register producing the spreading chip sequence, q(k). The SSDH transmitter may further comprise a spreading encoder 230. The spreading encoder 230 multiplies a bit sequence b(n) and the chip pattern c(k) to produce a phase envelope sequence, $\sigma(k)$. The SSDH transmitter may further comprise a PSK (Phase Shift Keying) modulator 240. PSK describes a modulation technique that conveys data by altering the phase of the carrier wave. The SSDH transmitter may further comprise an AC notch filter 250 for attenuating a desired carrier frequency, as described in more detail below. In accordance with another exemplary embodiment as depicted in FIG. 2B, the SSDH transmitter may comprise a DC notch filter 260, instead of the AC notch filter 250, as described in more detail below.

In accordance with one embodiment of the present disclosure, it may be desirable to allow for users from many locations to be connected together in a conference call and share data. A problem of sharing a single audio channel for multiple data streams arises. In the simplest case of a point-to-point call, there are only two users. The two users are able to share the single channel by use of random back offs and/or line echo cancellation.

For more than two users, the spread spectrum encoder may include CDMA. This is done by using different spreading codes for different users which are nearly orthogonal to each other. That is, the cross correlation may be minimized as follows:

$$\text{cost to min} = \sum_{k=1,2,\ldots L} C(\text{user}A, k)C(\text{user}B, k+m) \text{ for all } m \text{ and all user} A \neq \text{user}B, \qquad \text{Eq. 1}$$

wherein k represents chip time, i.e., discrete time, and L represents the period or length of the spreading chip sequence.

Figure 3:
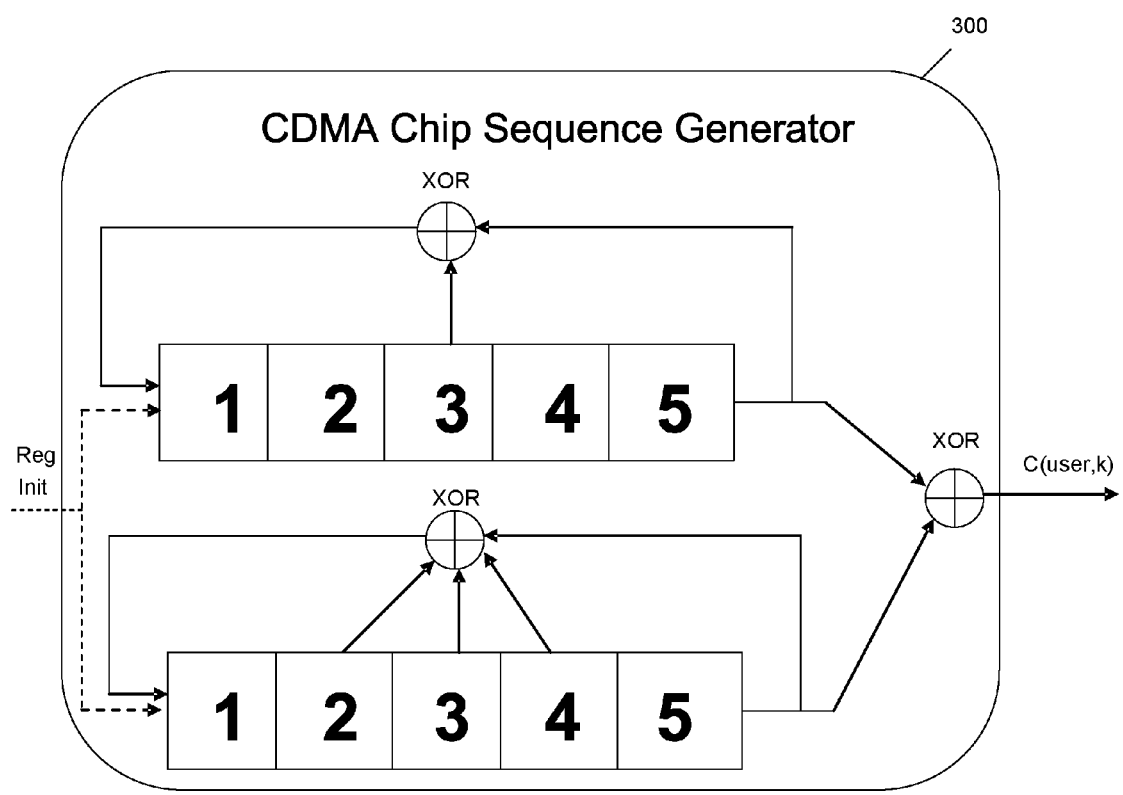
FIG. 3 depicts a block diagram of an exemplary CDMA chip sequence generator in accordance with various embodiments of the present disclosure.

A solution for the above criteria may be provided by a pseudonoise (PN) sequence which may be provided by the Gold codes. They can be generated with two linear feedback shift register produced bit sequences which are XORed together. FIG. 3 depicts a block diagram of an exemplary CDMA chip sequence generator 300. In accordance with various embodiments of the present disclosure, the chip sequence generator 220 of FIG. 2A or 2B may be embodied as the CDMA chip sequence generator 300 of FIG. 3. In this example, L is 31 chips per symbol. Different users are obtained by selecting different initializations for the registers. All combinations of initializations may be tried to find the best combinations to minimize the cross correlation.

Figure 4:
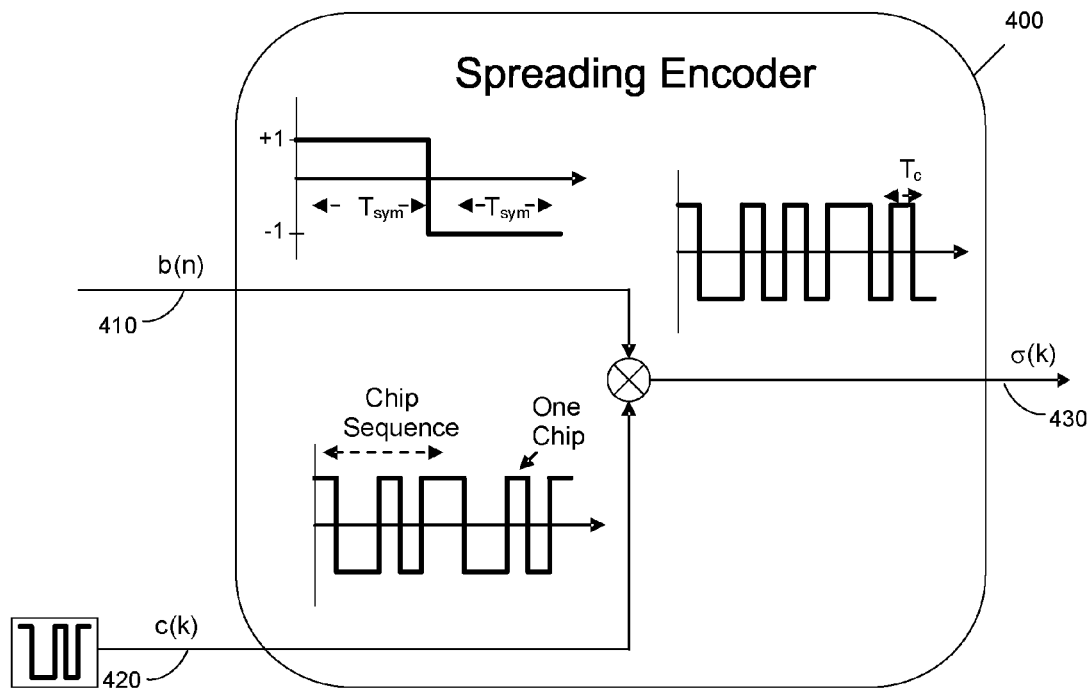
FIG. 4 depicts a block diagram of an exemplary spreading encoder in accordance with various embodiments of the present disclosure.

Referring again to FIGS. 2A and 2B, the spreading encoder 230 may be embodied as shown in FIG. 4, which depicts a block diagram of an exemplary spreading encoder 400 in accordance with various embodiments of the present disclosure. In one embodiment, the spreading encoder 400 may utilize direct sequence spread spectrum (DSSS) techniques. The spreading encoder 400 multiplies a bit sequence 410, denoted as b(n), and a chip pattern 420, denoted as c(k), to produce a phase envelope sequence 430, denoted as σ(k). The bit sequence 410 to the spreading encoder 410 represents a symbol sign on the transmitter of +1 or −1.

In accordance with a DSSS technique, a spreading chip sequence q(k) may be defined as follows:

q(k) are elements of {−1,1} only defined for indexes k over {1, 2, 3, . . . , L}. Eq. 2

The periodic chip pattern c(k) may be defined as follows:

$c(k)=q((k-1)\bmod L)+1)$, for all integers $k$. Eq. 3

That is, $c(k+nL)=q(k)$, Eq. 4 where n is over all integers and k is over {1, 2, 3, . . . L}.

The chip sequence pattern may be designed with criteria as follows:

$$\sum_{k=1,2,\ldots L} C(k)C(k) = L, \qquad \text{Eq. 5}$$

and the offset correlation may be minimized as follows:

$$\text{cost to min} = \sum_{k=1,2,\ldots L} C(k)C(k+m) \text{ for } m \neq 0 \qquad \text{Eq. 6}$$

The index n represents symbol time running at a period of $T_{sym}$. The period $T_{sym}$ may be set such that $T_{sym}=LT_c$ Eq. 7

The synchronous chip time k from the bit time n may be computed with the following relationship:

$k=nL$ Eq. 8

The inverse is computed as follows:

$n=\lfloor k/L \rfloor$, Eq. 9 wherein $\lfloor \cdot \rfloor$ is the floor operator. We can now define how we generate σ(k) from the symbol sequence as follows:

$\sigma(k)=c(k)b(\lfloor k/L \rfloor)$ Eq. 10

Figure 5:
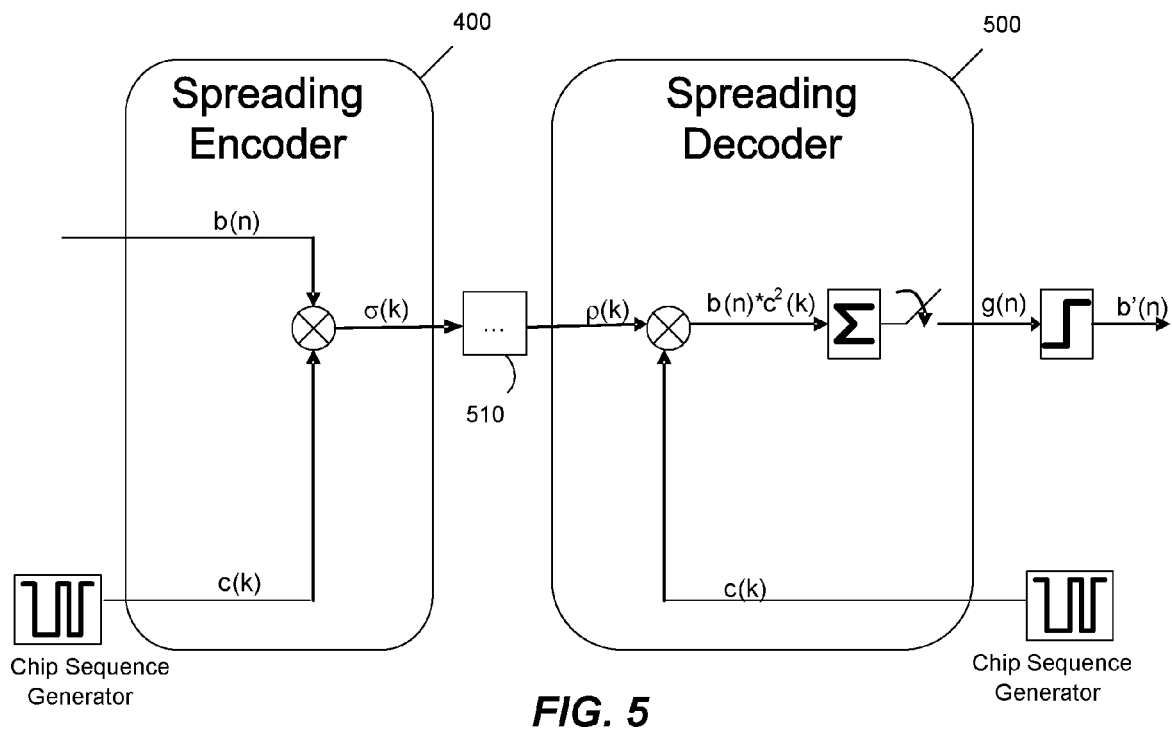
FIG. 5 depicts a block diagram of an exemplary spreading encoder and spreading decoder in accordance with various embodiments of the present disclosure.

Reference is now made to FIG. 5 which depicts a block diagram of an exemplary spreading decoder 500 in communication with the spreading encoder 400 of FIG. 4 in accordance with various embodiments of the present disclosure. A communication channel 510 such as, for example, a telephone channel or a radio channel, provides a link between the encoding side and the decoding side. At the receiver side after demodulation of a clean synchronized signal, we find as follows:

$\rho(k)=\sigma(k)=c(k)b(\lfloor k/L \rfloor)$, Eq. 11 wherein ρ(k) represents the received phase envelope at output of a PSK Demodulator, as explained in more detail below.

We now multiply by the chip sequence pattern one more time, as follows:

$c(k)\rho(k)=c^2(k)b(\lfloor k/L \rfloor)$ Eq. 12

Note that since c(k) is from the set {−1, 1}, it follows that $c^2(k)=1$ such that $c(k)\rho(k)=b(\lfloor k/L \rfloor)$ Eq. 13

A true channel will have noise to average out. This can be achieved with a summation, as follows:

$$g(n) = \sum_{k=1,2,\ldots L} c(k+nL)r(k+nL) \qquad \text{Eq. 14}$$

$$= \sum_{k=1,2,\ldots L} b(\lfloor (k+nL)/L \rfloor) \qquad \text{Eq. 15}$$

$$= Lb(n) \qquad \text{Eq. 16}$$

where n is over all integers and k is over {1, 2, 3, . . . L}.

The gain factor L is just a scaling. We can recover b(n) by looking at the sign of g(n) as follows:

$b'(n)=\text{sign}[g(n)]=\text{sign}[Lb(n)]$ Eq. 17

In the absence of noise, b'(n)=b(n) decodes error free.

Let us consider the case when there is some error on g(n) due to noise.

$g(n)=Lb(n)+\epsilon_N(n)$, Eq. 18 where $\epsilon_N(n)$ represents an error due to noise interference. We may try to recover b(n) by looking at the sign of g(n)

$b'(n)=\text{sign}(g(n))=\text{sign}(Lb(n)+\epsilon_N(n))$ Eq. 19

We will have a decoding error for large $\epsilon_N(n)$. Specifically, we have an error in b'(n) when:

$\epsilon_N(n)\cdot\text{sign}(Lb(n))>1$ Eq. 20

That is, probability of error is dominated by the magnitude of $\epsilon_N(n)$:

$\text{Prob}(b'(n)\text{Decision Error})=\text{Prob}(\epsilon(n)\text{sign}(Lb(n))>1)$ Eq. 21

This probability of error is controlled by the spreading gain which is a function of L. Here we derive our selected L. Our spreading chip rate $R_c$ will be $R_c=2000$ Chips/Second. Our theoretical transmission bit rate $R_b$ (i.e., the rate of b(n)) was set to $R_b \leq 25.6021$ bps. With the redundancy of error corrective coding, our transmission symbol rate $R_{sym}$ (i.e., the rate of data(m)) may have to be at least twice this, i.e., $R_{sym} \geq 50$. To obtain this symbol rate, we may choose from known good spreading patterns. An appropriate amount of spreading was thus found with L=31 Chips/Symbol.

This L gives us our spreading gain. It can be shown that for every halving of bit rate, we get approximately 3 dB of spreading gain. That is, $$\text{spreading gain} = 3*\log_2(L) = 14.8626 \qquad \text{Eq. 22}$$

Given that our PSK system had a required SNR of 8.3 dB, as described in more detail below, we now find SNR≧−6.5626 dB.

Figure 6:
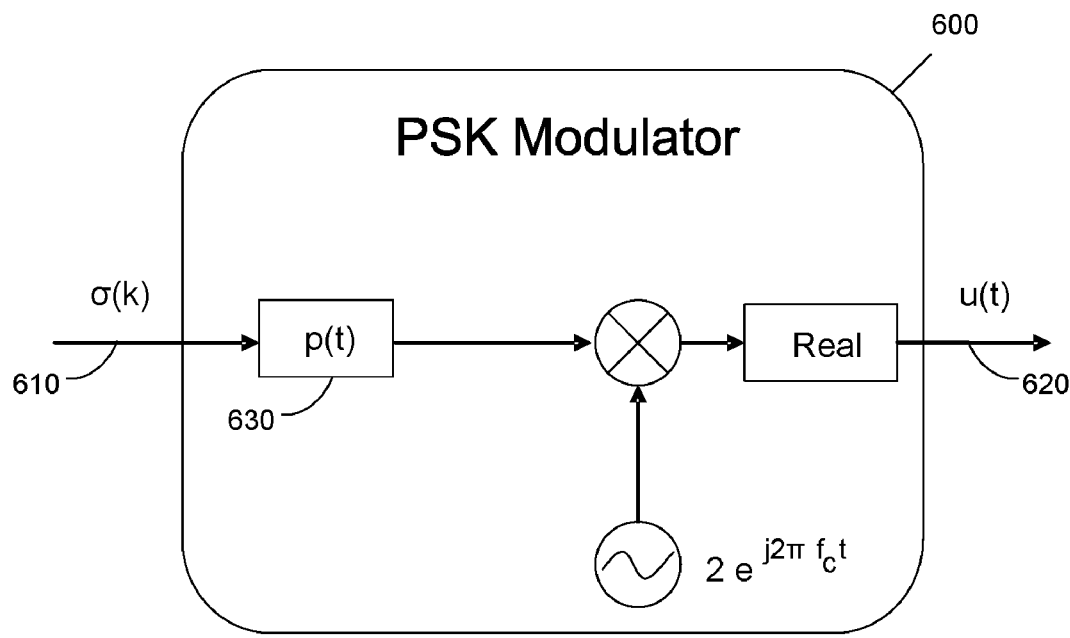
FIG. 6 depicts a block diagram of an exemplary PSK modulator in accordance with various embodiments of the present disclosure.

In accordance with various embodiments of the present disclosure, the SSDH systems, methods, and devices may be built upon PSK modulation. Referring again to FIG. 2A, the PSK modulator 240 may be embodied as shown in FIG. 6, which depicts an exemplary block diagram of a PSK modulator 600 in accordance with various embodiments of the present disclosure. In PSK modulation, all information is encoded into the phase of a carrier tone. The phase will switch over time to send the information. Let σ(k) represent the phase envelope sequence 610 to be modulated and sent, which may be defined as follows:

$$\sigma(k) \text{ are elements of } 1\{, e^{j2\pi(1/\eta)}, e^{j2\pi(2/\eta)}, \ldots \\ e^{j2\pi((\eta-1)/\eta)}\}, \text{ for each discrete time index k,} \qquad \text{Eq. 23}$$

wherein j represents the unit imaginary number ($j^2=-1$), and η represents the number of phases used by the PSK modulator.

The relationship between continuous time, t, and discrete time, k, is given by the period $T_c$.

$$t = kT_c \qquad \text{Eq. 24}$$

$$k = \lfloor t/T_c \rfloor, \qquad \text{Eq. 25}$$

where $\lfloor \cdot \rfloor$ is the floor operator.

Smoothed phase transitions may be created by low pass filtering σ(k) with p(t).

$$s(t) = \Sigma_k \sigma(k) p(t - kT_c), \qquad \text{Eq. 26}$$

wherein s(t) represents the baseband phase modulated signal in the transmitter, and filter 630, denoted as p(t), represents the square root raise cosine pulse shaping filter with 60% roll off.

We may select p(t) to satisfy the Nyquist criteria. That is, when we convolve s(t) with p(t) we obtain the following:

$$s(kT_c)*p(kT_c) = \sigma(k) \qquad \text{Eq. 27}$$

Let us modulate by multiplying s(t) by a carrier tone:

$$u(t) = 2\text{Real}[s(t)e^{j2\pi f_c t}] \qquad \text{Eq. 28}$$

$$= s(t)e^{j2\pi f_c t} + s^*(t)e^{-j2\pi f_c t}, \qquad \text{Eq. 29}$$

wherein u(t) represents the pass band output 620 of the PSK modulator 600, $f_c$ represents a carrier frequency, and s*(t) represents the complex conjugate of s(t). Now u(t) may be produced by the PSK modulator 600.

Figure 7:
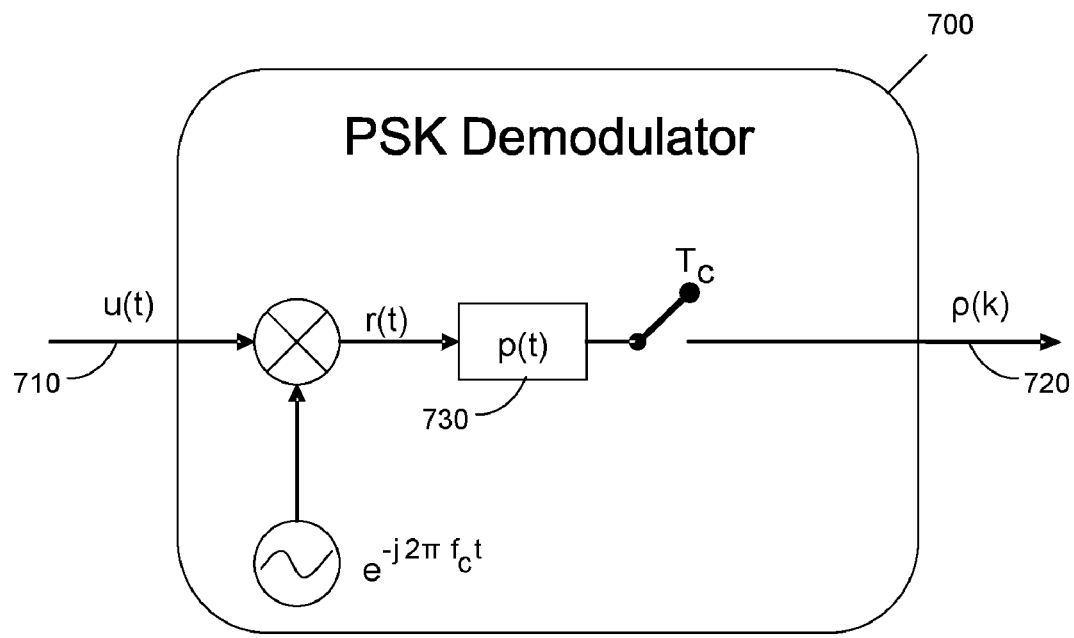
FIG. 7 depicts a block diagram of an exemplary PSK demodulator in accordance with various embodiments of the present disclosure.

At the receiver side, the modulated signal 710, denoted as u(t), is demodulated to compute the received phase envelope 720, denoted as ρ(k). FIG. 7 depicts an exemplary block diagram of a PSK demodulator 700 in accordance with various embodiments of the present disclosure. In the present example, it is assumed that u(t) is obtained in the receiver with no noise, voice interference, or synchronization issues. The baseband phase demodulated signal at the receiver, denoted as r(t), may be given as follows:

$$r(t) = u(t)e^{-j2\pi f_c t} \qquad \text{Eq. 30}$$

$$= s(t) + s^*(t)e^{-j4\pi f_c t} \qquad \text{Eq. 31}$$

At this point we convolve with the matched filter 730, denoted as p(t). We can assume the low pass filter effectively suppresses the second term, yielding:

$$r(t)*p(t) = s(t)*p(t) \qquad \text{Eq. 32}$$

Finally we sample at $T_c$ $$\rho(k) = r(kT_c)*p(kT_c) \qquad \text{Eq. 33}$$

$$= s(kT_c)*p(kT_c) \qquad \text{Eq. 34}$$

$$= \sigma(k) \qquad \text{Eq. 35}$$

Note that in this ideal noiseless example, we have recovered the transmitted information ρ(k)=σ(k).

With noise, the performance of the PSK modulator/demodulator is a function of $T_c$ or $R_c=1/T_c$. After collecting data with $R_c=2000$, it was determined that u(t) should transmit with a high SNR to achieve a bit error rate of $10^{-4}$. It was determined that PSK alone should have SNR≧8.3 dB.

In accordance with various embodiments of the present disclosure, transparency may be improved by reducing audible artifacts of spread spectrum data. It has been observed that u(t) has an artifact referred to as a humming sound at approximately 1800 Hz. To improve upon this, an 1800 Hz notch filter may be added. Thus, the AC notch filter 250 depicted in FIG. 2A may comprise an 1800 Hz notch filter, in one embodiment. In accordance with other embodiments, the AC notch filter 250 may be implemented with respect to other carrier frequencies.

The cause of the humming sound is a slight DC offset in s(t). One can alternatively implement a DC notch filter on s(t). Thus, the DC notch filter 260 depicted in FIG. 2B may be used to reject a zero frequency DC component such that $$\sigma(k) = DC\text{Notch}[c(k)b(\lfloor k/L \rfloor)] \qquad \text{Eq. 36}$$

wherein Eq. 36 replaces Eq. 11 for the output of the spreading encoder.

The offset is just strong enough to be perceptible by a sensitive ear. However, it is small enough that the effect of its removal is considered to have negligible impact on the data transmitter/receiver.

In accordance with other embodiments of the present disclosure, the humming sound may be reduced using other techniques. For example, instead of a notch filter, redundant bits may be inserted into the bit stream for spectral control of the DC bias. The redundant bits can be ignored at the receiving end based on an agreed upon rule.

In addition, an artifact referred to as a slight buzzing sound has been observed in u(t). It was discovered that the cause of this buzzing sound was the periodic nature of c(k). Note c(k) has a period of L given by c(k)=q((k−1) mod L)+1). Lengthening the period of c(k) may suppress the buzzing sound. An effective solution was found that uses multiple Gold chip sequence generators which differ by their initialization points. Each provides a unique $q_i(k)$. In generating c(k), every L chips we switch to a new $q_i(k)$. It was found that, with a suitable pseudo random switching pattern, four Gold chip sequence generators provide the desired suppression of the buzzing sound; however, a lesser or greater number of chip sequence generators may be used. For example, some benefit may be found by using two Gold chip sequence generators.

Figure 8:
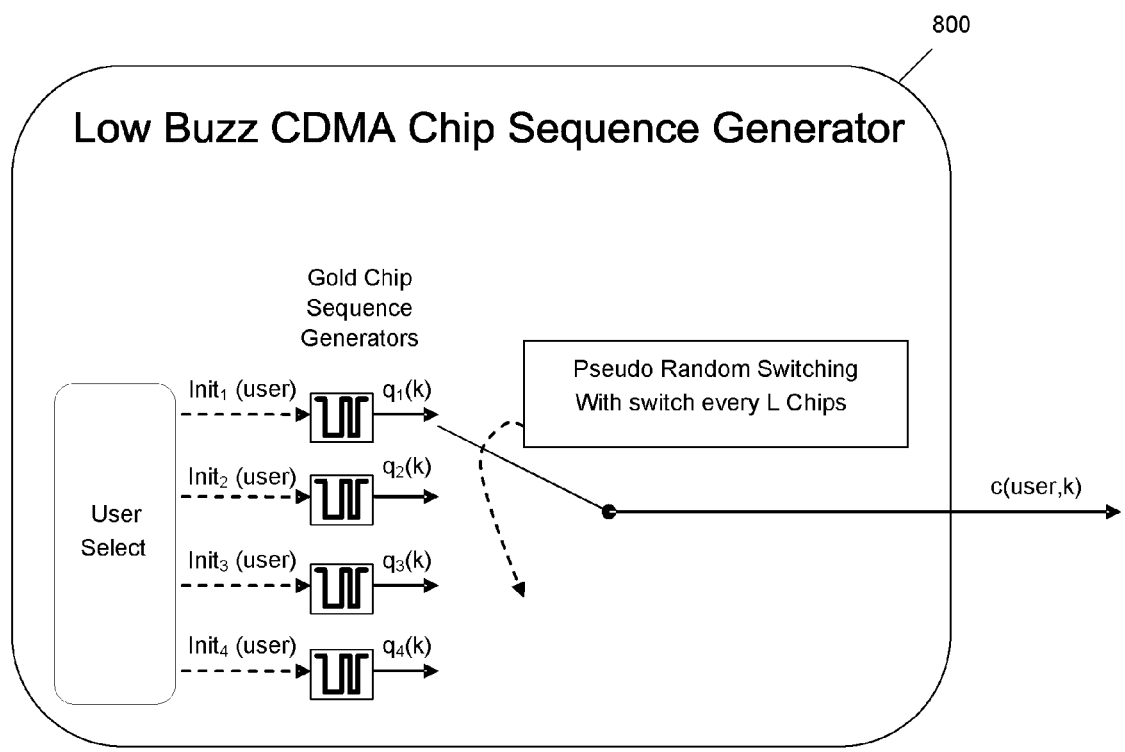
FIG. 8 depicts a block diagram of an exemplary low buzz CDMA chip sequence generator in accordance with various embodiments of the present disclosure.

FIG. 8 depicts a block diagram of an exemplary low buzz CDMA chip sequence generator 800 in accordance with various embodiments of the present disclosure. In accordance with such embodiments, the user select 210 and the chip sequence generator 220 of FIG. 2A or 2B may be embodied as the low buzz CDMA chip sequence generator 800 of FIG. 8.

Another audible artifact referred to as a beat was observed in the spread spectrum signal u(t). It was determined that the cause of the beat was the limiting of σ(k) to only two phases. It was found that increasing the number of phases (e.g., at least four phases) helped to suppress the beat. In some embodiments, the four phases may be approximately 90° apart, although they need not be spaced evenly apart. It was further found that a σ(k) with at least eight (η=8) phases is more effective for suppressing the beat. In some embodiments, the eight phases may be approximately 45° apart and randomly selected. This may be accomplished by taking the output of the two phased spread spectrum encoder and rotating the phase by a psuedo random increment of approximately 45° every chip.

Figure 9:
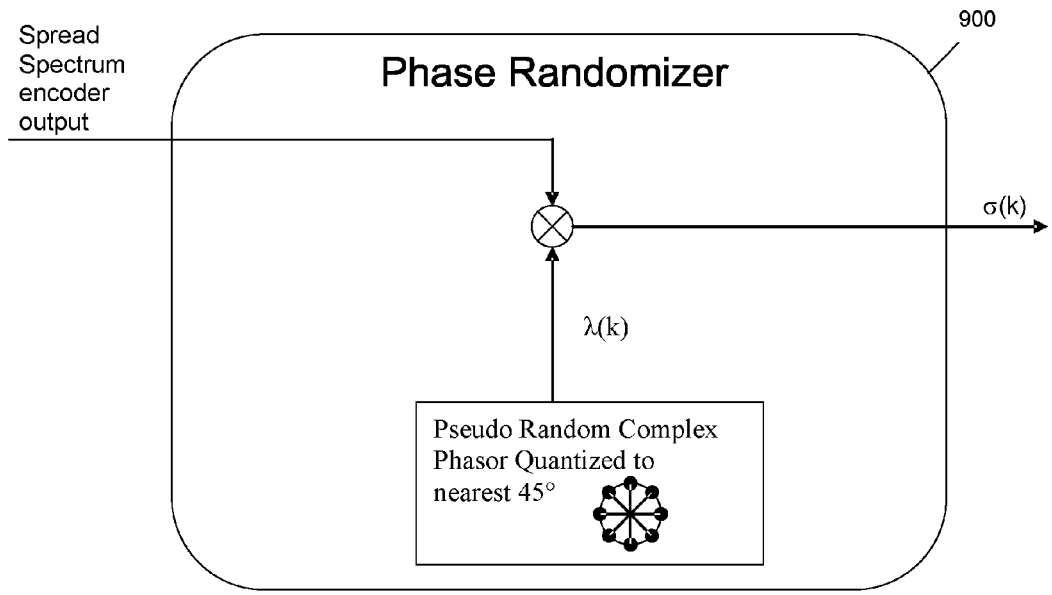
FIG. 9 depicts a block diagram of an exemplary phase randomizer in accordance with various embodiments of the present disclosure.

FIG. 9 depicts a block diagram of an exemplary phase randomizer 900 in accordance with various embodiments of the present disclosure. The output of a spread spectrum encoder may be fed into the phase randomizer 900 and multiplied with a pseudo random phase pattern, as follows:

$$\sigma(k) = \lambda(k) \cdot \text{spread spectrum encoder output}, \quad \text{Eq. 37}$$

wherein λ(k) represents a pseudo random pattern such that λ(k) are selected from the phasor set $\{1, e^{j\pi(1/4)}, e^{j\pi(1/2)}, \ldots, e^{j\pi(7/4)}\}$ for each discrete time index k.

The complex phasor λ may be generated by a pseudo random index. This index may be produced by a 15-bit linear shift feedback register.

Figure 10:
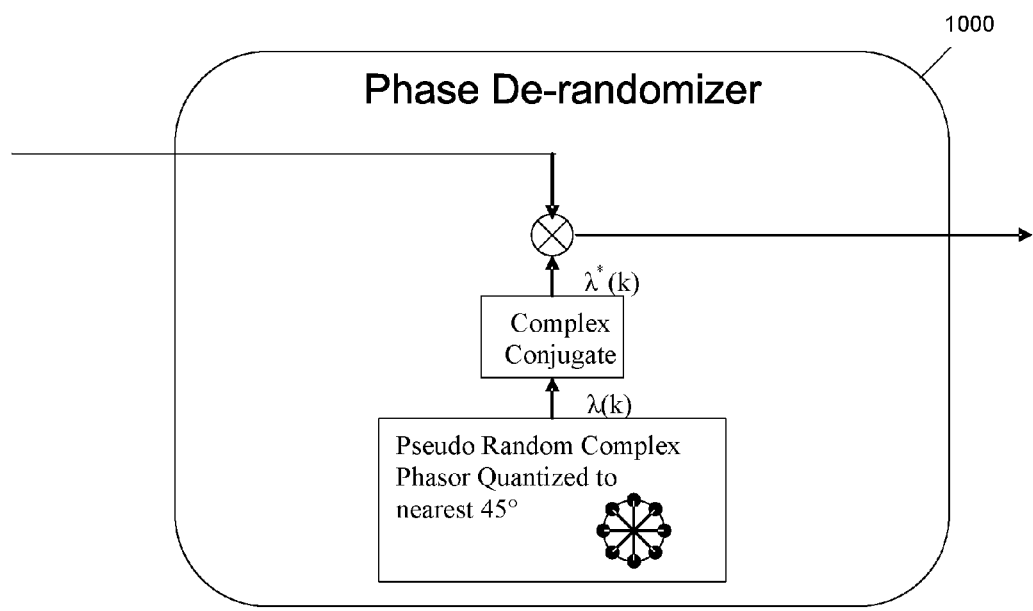
FIG. 10 depicts a block diagram of an exemplary phase de-randomizer in accordance with various embodiments of the present disclosure.

At the receiver side, the phase scrambling can be decoded by multiplying the demodulated signal by the complex conjugate of λ(k). FIG. 10 depicts a block diagram of an exemplary phase de-randomizer 1000.

Figure 11A:
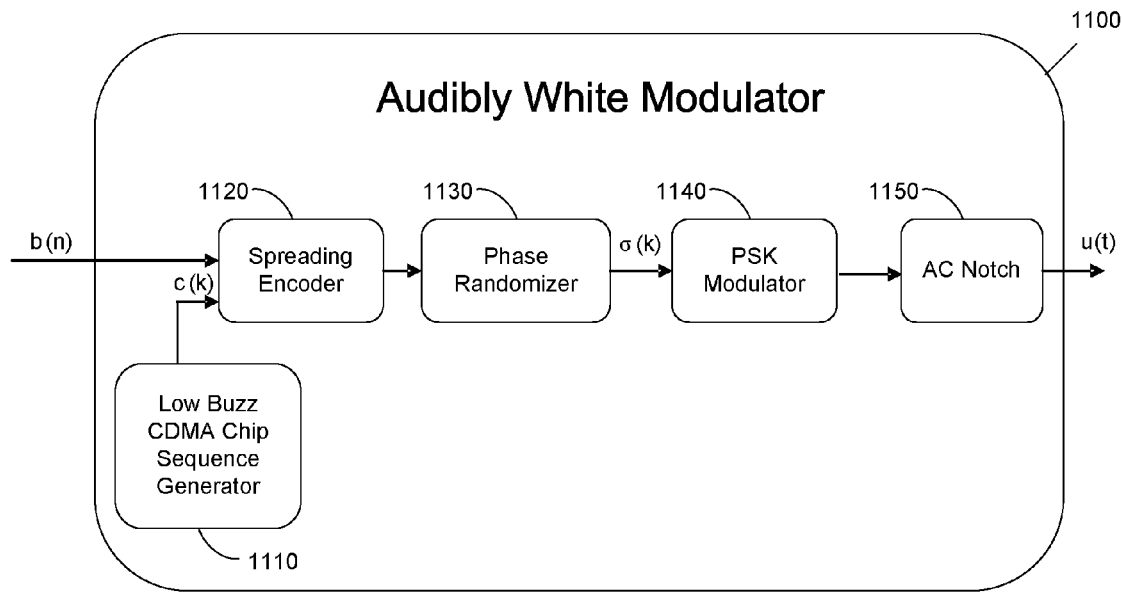
FIG. 11A depicts a block diagram of an exemplary modulator in accordance with one embodiment of the present disclosure.

FIG. 11A depicts a block diagram of an exemplary Audibly White Modulator 1100 in accordance with one embodiment of the present disclosure. The Audibly White Modulator 1100 produces a combined signal wherein the hidden data may more resemble the sound of natural white noise. In accordance with some embodiments, the hidden data may not be absolutely quiet, but may be relatively quiet, relative to the voice signal. The Audibly White Modulator 1100 is not intended to produce a sound that meets the mathematical definition of white noise, but rather, the noise (if any) heard by a human listener is intended to be perceived as white noise.

The Audibly White Modulator 1100 may comprise a low buzz CDMA chip sequence generator 1110 such as that depicted in FIG. 8. The Audibly White Modulator 1100 may further comprise a spreading encoder 1120 such as that depicted in FIG. 4. In another embodiment, the low buzz CDMA chip sequence generator 1110 may be considered as a component of the spreading encoder 1120. The Audibly White Modulator 1100 may further comprise a phase randomizer 1130 such as that depicted in FIG. 9. The Audibly White Modulator 1100 may further comprise a PSK modulator 1140 such as that depicted in FIG. 6. The Audibly White Modulator 1100 may further comprise an AC notch filter 1150 for attenuating a desired carrier frequency, such as 1800 Hz or other carrier frequency.

Figure 11B:
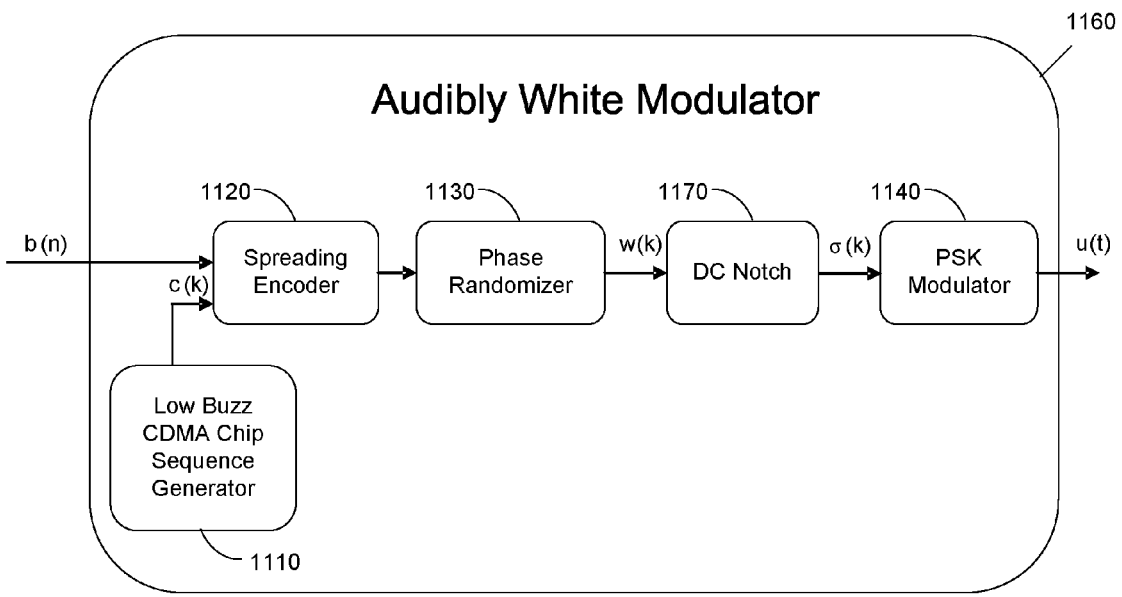
FIG. 11B depicts a block diagram of an exemplary modulator in accordance with another embodiment of the present disclosure.

In accordance with another exemplary embodiment as depicted in FIG. 11B, an Audibly White Modulator 1160 may comprise a DC notch filter 1170, instead of the AC notch filter 1150.

Figure 12:
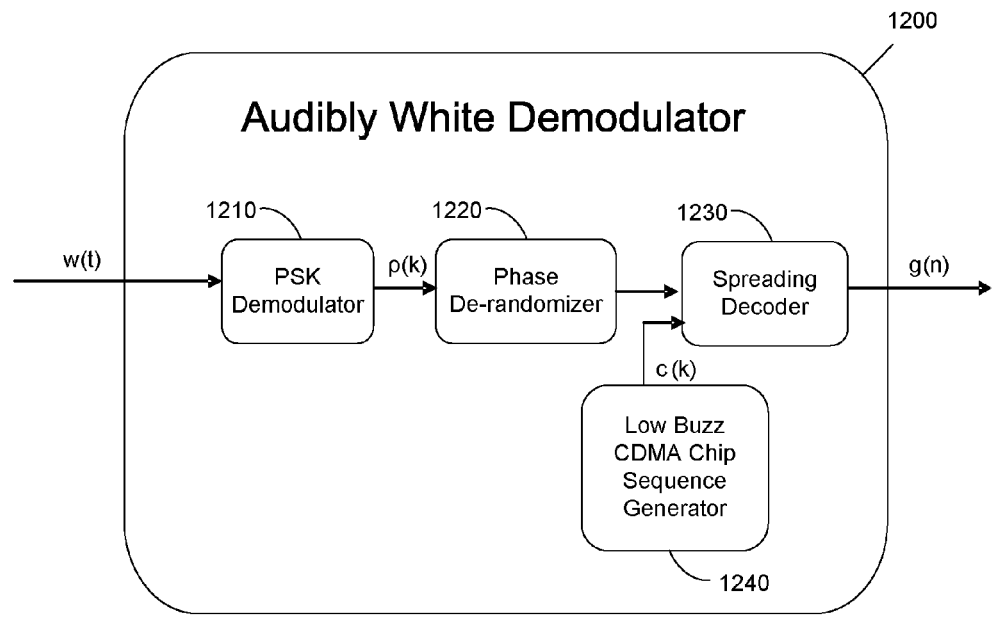
FIG. 12 depicts a block diagram of an exemplary demodulator in accordance with various embodiments of the present disclosure.

A block diagram of an exemplary embodiment of an Audibly White Demodulator 1200 is depicted in FIG. 12. The Audibly White Demodulator 1200 may comprise a PSK demodulator 1210 such as the PSK demodulator 700 depicted in FIG. 7 and described herein. The Audibly White Demodulator 1200 may further comprise a phase de-randomizer 1220 such as the phase de-randomizer 1000 depicted in FIG. 10 and described herein. The Audibly White Demodulator 1200 may further comprise a spreading decoder 1230 such as the spreading decoder 500 depicted in FIG. 5 and described herein. The Audibly White Demodulator 1200 may further comprise a low buzz CDMA chip sequence generator 1240 such as the low buzz CDMA chip sequence generator 800 depicted in FIG. 8 and described herein. In some embodiments, the low buzz CDMA chip sequence generator 1240 may be considered as a component of the spreading decoder 1230.

Figure 13:
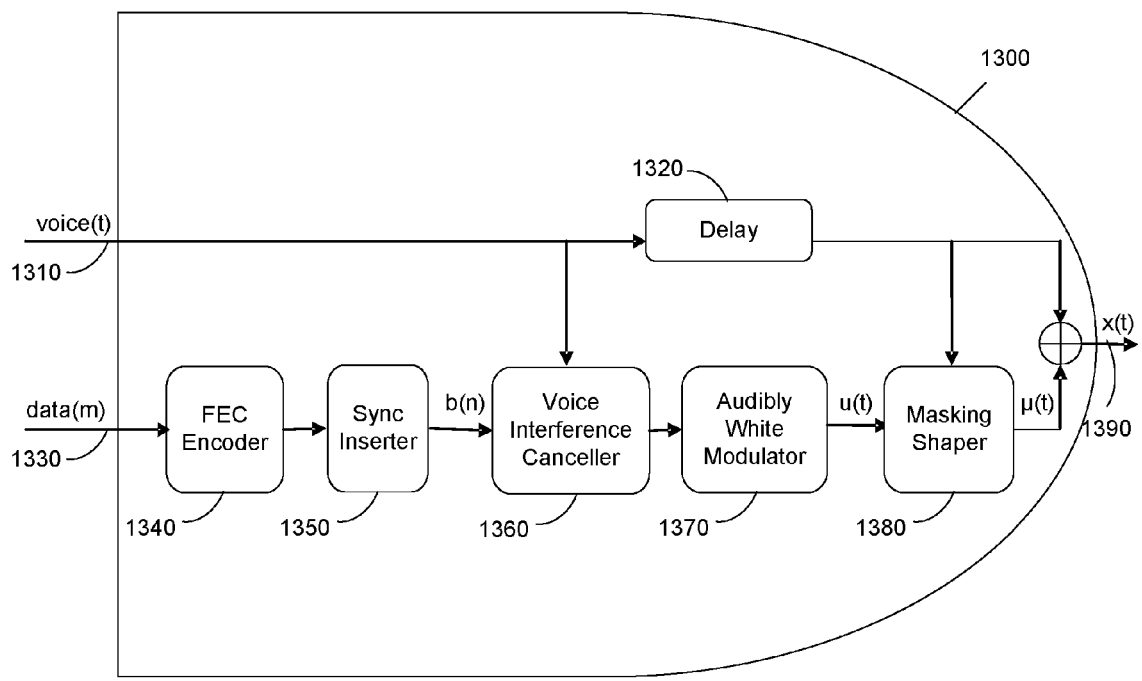
FIG. 13 depicts a block diagram of an exemplary data and voice mixer in accordance with various embodiments of the present disclosure.

Reference is now made to FIG. 13 which depicts a block diagram of an exemplary data and voice mixer 1300 in accordance with various embodiments of the present disclosure. A voice signal 1310 to be transmitted is denoted by voice(t). A delay unit 1320 may be included to align the voice signal 1310 for proper cancellation.

The binary sequence 1330 to be transmitted is denoted by data(m). The binary sequence 1330 may be fed into an FEC (Forward Error Correction) encoder 1340. The output of the FEC encoder 1340 may be fed into a sync inserter 1350. Various embodiments of the FEC encoder 1340 and the sync inserter 1350 are described below in more detail. The output of the sync inserter 1350, denoted as b(n), may be fed into a voice interference canceller 1360. Exemplary embodiments of the voice interference canceller 1360 may be found in U.S. application Ser. No. 11/148,087, the contents of which have been incorporated herein by reference.

The output of the voice interference canceller 1360 may be fed into an audibly white modulator 1370 such as that depicted in FIG. 11A or 11B. The output of the audibly white modulator 1370, denoted as u(t), may be fed into a masking shaper 1380. Various embodiments of the masking shaper 1380 are described below in more detail. The output of the masking shaper 1380, denoted as μ(t), may be added with the output of the delay unit 1320 to produce a transmitter signal denoted as x(t). The transmitter signal 1390 may be used as an input to, for example, a telephone channel or other communication channel.

Figure 14:
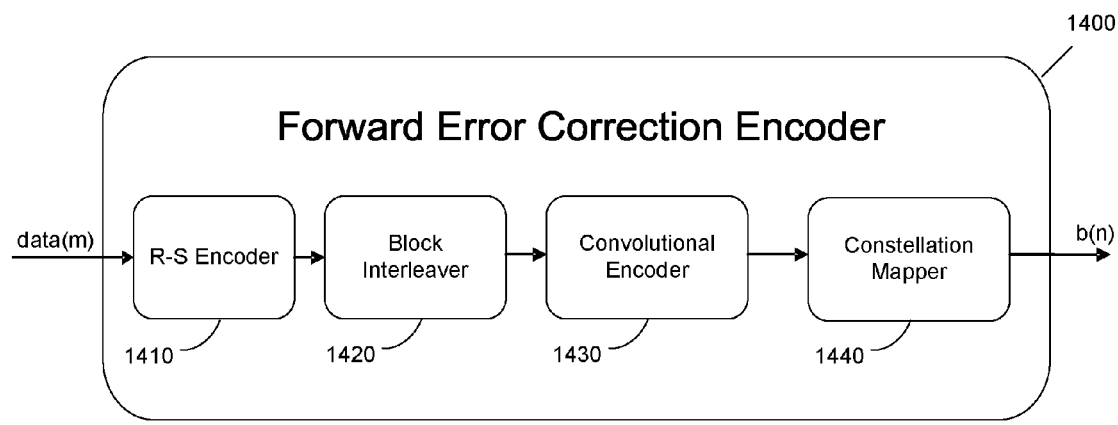
FIG. 14 depicts a block diagram of an exemplary Forward Error Correction encoder in accordance with various embodiments of the present disclosure.

Reference is now made to FIG. 14 which depicts a block diagram of an exemplary embodiment of an FEC encoder 1400 in accordance with various embodiments of the present disclosure. The FEC encoder 1400 may comprise a Reed-Solomon encoder 1410, a block interleaver 1420, a convolutional encoder 1430, and a constellation mapper 1440. In connection with implementing Forward Error Correction methods, a concatenated code with an inner soft decoded convolutional code and an outer algebraically decoded Reed-Solomon code may be used.

Figure 15:
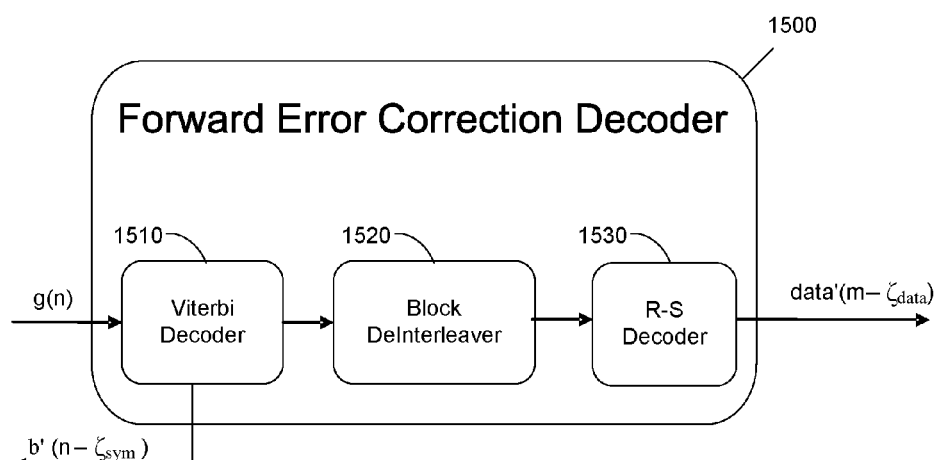
FIG. 15 depicts a block diagram of an exemplary Forward Error Correction decoder in accordance with various embodiments of the present disclosure.

The inverse may be used on the receiver side, as shown in FIG. 15 which depicts a block diagram of an exemplary FEC decoder 1500 in accordance with various embodiments of the present disclosure. The FEC decoder 1500 may comprise a Viterbi decoder 1510, a block deinterleaver 1520, and a Reed-Solomon decoder 1530.

Figure 16:
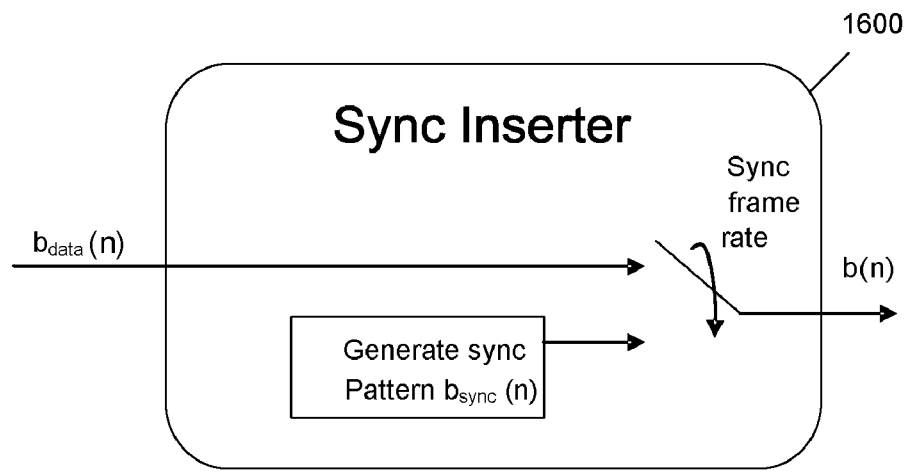
FIG. 16 depicts a block diagram of an exemplary sync pattern inserter in accordance with various embodiments of the present disclosure.

Reference is now made to FIG. 16 which depicts a block diagram of an exemplary embodiment of a sync pattern inserter 1600 in accordance with various embodiments of the present disclosure. A short reference pattern of a known sign may be transmitted. In one embodiment, a 10-symbol pattern may be chosen as follows:

$$b_{sync}(n)=\{+1,-1,-1,-1,+1,1,-1,+1,-1,+1\}. \quad \text{Eq. 38}$$

The more often this is transmitted, the more often we can synchronize or resynchronize. However the overall bit rate is lowered. In one embodiment, the pattern may be sent after every four cycles of the interleaver.

To make the detection more reliable on the receiver, an additional modification may be made within the transmitter's Low Buzz CDMA Chip Sequence Generator. As described above, four Gold chip sequence generators may be provided to reduce the buzz throughout the frame. During the transmission of the sync, a fifth orthogonal user dependent Gold chip sequence generator may be used.

Figure 17:
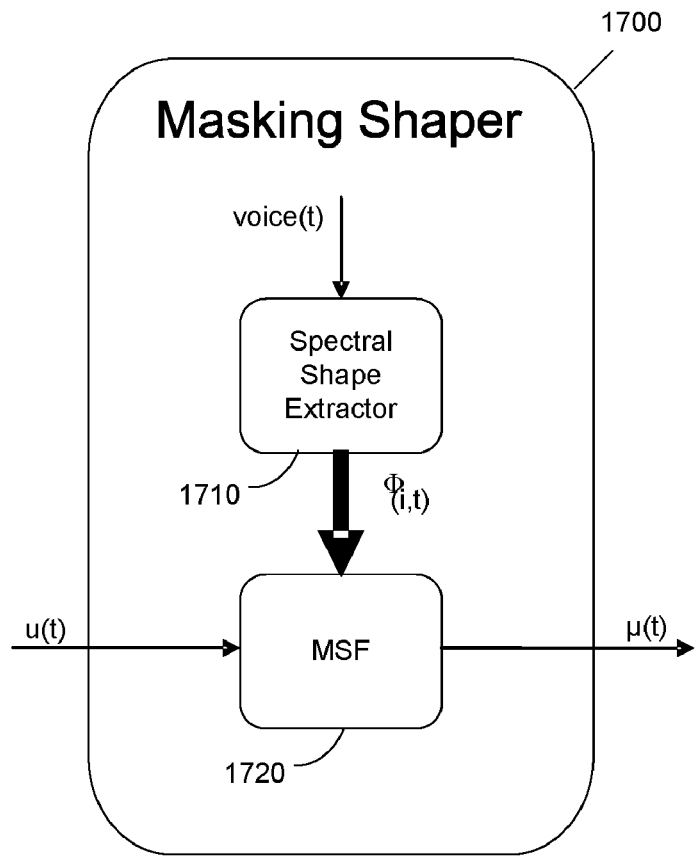
FIG. 17 depicts a block diagram of an exemplary masking shaper in accordance with various embodiments of the present disclosure.
Figure 18:
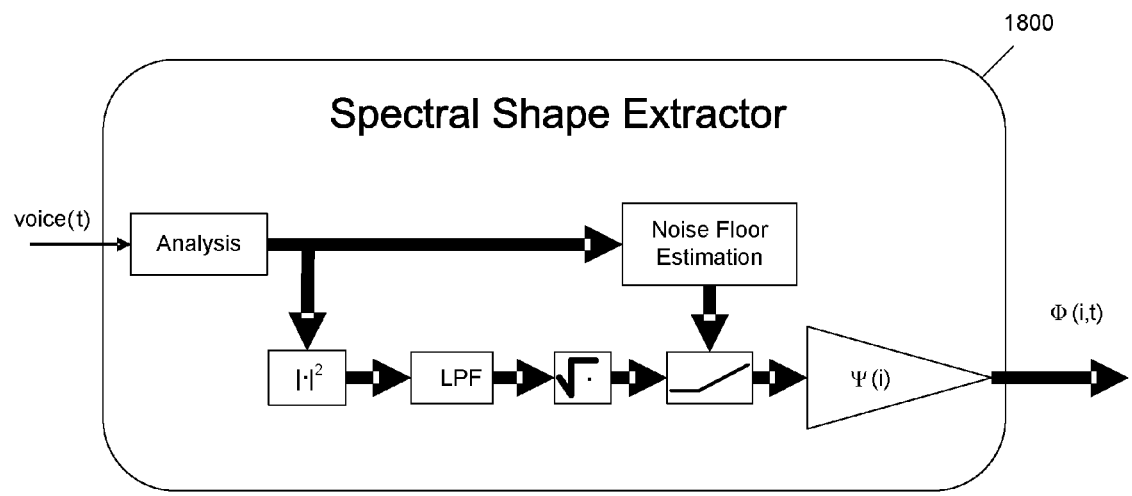
FIG. 18 depicts a block diagram of an exemplary spectral shape extractor in accordance with various embodiments of the present disclosure.
Figure 19:
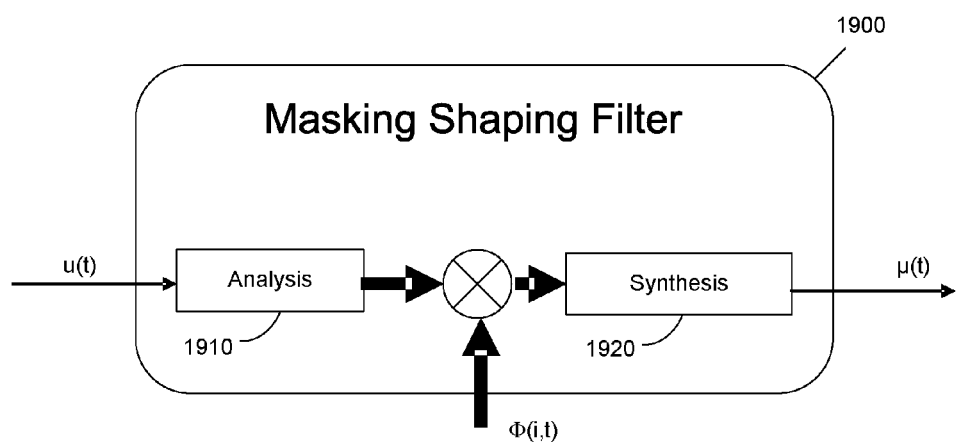
FIG. 19 depicts a block diagram of an exemplary masking shaping filter in accordance with various embodiments of the present disclosure.

Reference is now made to FIG. 17 which depicts a block diagram of an exemplary embodiment of a masking shaper 1700 in accordance with various embodiments of the present disclosure. The masking shaper 1700 may comprise a spectral shape extractor 1710, an exemplary embodiment of which is shown in FIG. 18. The masking shaper 1700 may further comprise a masking shaping filter (MSF) 1720, an exemplary embodiment of which is shown in FIG. 19. The MSF may be used to apply a spectral shape to the signal u(t).

The time domain signals may be generally band limited within approximately 0 Hz to approximately 4000 Hz in a typical telephone channel. This frequency band may be divided into a number of subbands, for example, 32 subbands of approximately 125 Hz each. A smaller or larger number of subbands may be used. The subbands may be indexed as follows:

$$i = \text{subband index}, \quad \text{Eq. 39}$$

wherein i is within the set $\{0, 1, 2, \ldots, 31\}$.

The spectral content of u(t) may be computed over a windowed period about time t in each subband i with the Analysis operator (1910) as follows:

$$U(i,t) = \text{Analysis}[u(t)], \quad \text{Eq. 40}$$

wherein U(i,t) is a complex signal.

This analysis can be implemented along with a counterpart Synthesis (1920) with perfect reconstruction.

$$u(t) = \text{Synthesis}[U(i,t)] = \text{Synthesis}[\text{Analysis}[u(t)]] \quad \text{Eq. 41}$$

A spectral shape may be applied to U(i,t) by means of a spectral gain $\Phi(i,t)$.

$$\mu(t) = \text{Synthesis}[\text{Analysis}[u(t)] \cdot \Phi(i,t)] \quad \text{Eq. 42}$$

$$= MSF[u(t)] \quad \text{Eq. 43}$$

The inverse operator of the Masking Shaping Filter is the Inverse Shaping Filter (ISF).

$$u(t) = \text{Synthesis}[\text{Analysis}[\mu(t)] \cdot (1/\Phi(i,t))] \quad \text{Eq. 44}$$

$$= ISF[\mu(t)] \quad \text{Eq. 45}$$

As the inversion may not be perfect, we have the following:

$$u(t) \approx ISF[MSF[u(t)]] \quad \text{Eq. 46}$$

The approximation approaches equivalency when $\Phi(i,t)$ varies slowly over time.

The final signal to be transmitted into the communication channel may be given by x(t) as follows:

$$x(t) = \text{voice}(t-\zeta_{voice}) + \mu(t), \quad \text{Eq. 47}$$

where $\zeta_{voice}$ represents a transmit delay for the voice signal. A listener may desire that the addition of the signal $\mu(t)$ sound like a low level white noise. Therefore, x(t) may sound much like the original voice(t) with additive noise. This noise can be kept low enough that its presence can be relatively undetectable compared to noise in voice(t) and additive noise of the telephone channel or other communication channel.

In accordance with various embodiments, it may be desirable to achieve a bit error rate on the receiver of approximately $10^{-4}$ or better. This may be accomplished by maximizing the SNR of the received version of x(t). Note from this perspective, voice(t) is noise. The telephone channel or other communication channel adds noise as well. The only signal is $\mu(t)$. Thus, it may be desirable to maximize the power at which $\mu(t)$ is transmitted. Increasing this power, however, may be audibly disadvantageous to listeners of voice(t) in x(t). The masking effect gives an upper limit of power at which $\mu(t)$ can be transmitted. It says that we can transmit $\mu(t)$ at as much as approximately 13 dB below voice(t) and it will be substantially undetectable to the human ear. To employ this masking, a spectral and time domain envelope may be provided for $\mu(t)$ that is near to that of voice(t). We can apply this gain and envelope with $\Phi(i,t)$. The spectral shape may be extracted as follows:

$$\text{VOICE}(i, t) = \text{Analysis}[\text{voice}(t)] \quad \text{Eq. 48}$$

$$RMSVOICE(i, t) = (LPF[|\text{VOICE}(i, t)|^2])^{1/2} \quad \text{Eq. 49}$$

$$\Phi(i, t) = \begin{cases} RMSVOICE(i, t) \cdot \Psi(i) & RMSVOICE(i, t) > NOISEFLOOR(i) \\ \Psi(i) & RMSVOICE(i, t) \leq NOISEFLOOR(i) \end{cases} \quad \text{Eq. 50}$$

An exemplary embodiment of a spectral shape extractor 1800 is shown in FIG. 18. The spectral extractor 1800 may comprise a square law envelope detector. It works on subbands to generate the spectral shape. For example, 32 envelope detectors may be implemented, one for each subband.

At the end, each band may be multiplied by a gain $\Psi(i)$ (which gain may be less than 1). This gain may be tuned to obtain the correct levels on $\mu(t)$. In one embodiment, we wish to be 13 dB below voice(t). Also, $\Psi(i)$ may be used to shape $\mu(t)$ to give a natural noise sound. Furthermore, it was found that attenuating the high and low bands of $\Psi(i)$ minimizes audible rough artifacts in x(t).

In accordance with various embodiments of the present disclosure, a lower limit may be placed on the spectral gain $\Phi(i,t)$. For $\mu(t)$ to survive the telephone or other channel, it should not drop below a certain energy level in any part of the spectrum. The lower limit is controlled by the noise floor of the voice signal, as discussed in more detail below.

The Masking effect may be used in the transmitter by the Masking Shaper 1700 of FIG. 17 and subsequently added with the voice signal itself.

Figure 20:
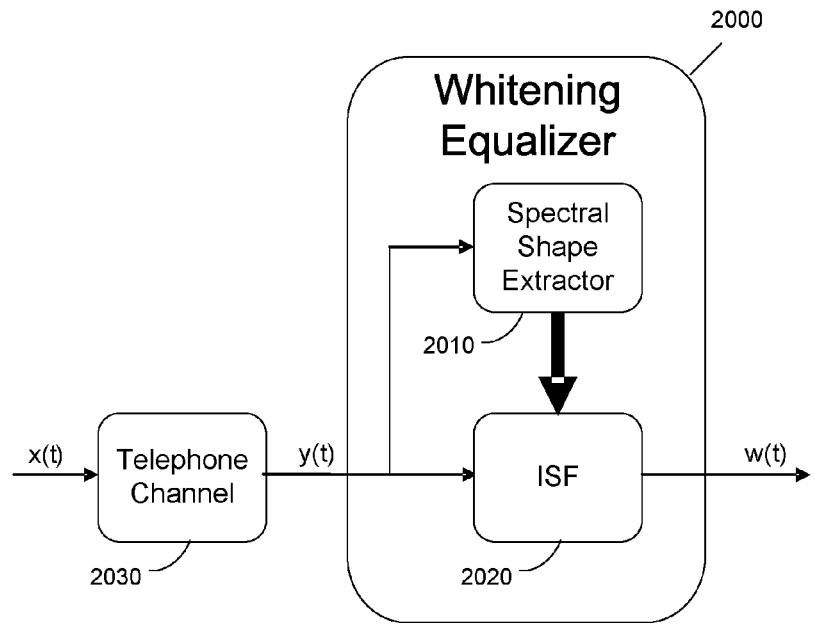
FIG. 20 depicts a block diagram of an exemplary whitening equalizer in accordance with various embodiments of the present disclosure.

Reference is now made to FIG. 20 which depicts a block diagram of an exemplary whitening equalizer 2000 at the receiving end in accordance with various embodiments of the present disclosure. The whitening equalizer 2000 may comprise a spectral shape extractor 2010. The whitening equalizer 2000 may further comprise an Inverse Shaping Filter (ISF) 2020.

A model of attenuation and noise for a Telephone Channel 2030 may be given as follows:

$$y(t) = h \cdot x(t) + \text{noise}(t), \quad \text{Eq. 51}$$

wherein h represents the channel gain.

The inverse shaping filter may be performed on the received signal such that w(t) is given as follows:

$$w(t) = ISF[y(t)] \quad \text{Eq. 52}$$

$$= ISF[h \cdot x(t) + \text{noise}(t)] \quad \text{Eq. 53}$$

$$= ISF[h \cdot \mu(t) + h \cdot \text{voice}(t) + \text{noise}(t)] \quad \text{Eq. 54}$$

$$= u(t) + ISF[h \cdot \text{voice}(t) + \text{noise}(t)] \quad \text{Eq. 55}$$

$$= u(t) + \delta(t), \quad \text{Eq. 56}$$

$$\text{where } \delta(t) = ISF[h \cdot \text{voice}(t) + \text{noise}(t)] \quad \text{Eq. 57}$$

The inverse shaping filter 2020 gives back the modulated data u(t) plus interference.

To run the inverse shaping filter, the Spectral Shape Extraction is performed on y(t). For the inverse shaping to work properly, the output of this extractor should be $h \cdot \Phi(i,t)$. That is the linear scale of its counterpart in the transmitter. This is complicated by the non-linearity of lower limiting in the extractor. A solution was found in which the lower limit is given as a function of the noise floor estimate of the signal.

In addition, the inverse shaping filter 2020 acts as a channel equalizer. In this example, it inverses h. In general, it will inverse a channel shape given by H(f). In addition, the shaping filter acts as a whitening filter for $\delta(t)$. This could be seen by the fact that $\Phi(i,t)$ is the shape of the voice(t), and therefore ISF[voice(t)] should be relatively white. This is beneficial as it may be desirable to decode the data may with a whitened interference.

There exist various ways of estimating the noise floor. In accordance with one embodiment of the present disclosure, the noise floor may be estimated as follows:

1) Compute the mean square on very small windows of signal.

2) Save the few smallest mean squares over a period of time.

3) Use the smallest mean squares to compute a root mean square.

4) As we converge, adjust size of window, the period, the method of mean.

5) On the transmitter side put a lower bound on the root mean square to account for the noise on the channel and the noise for adding $\mu(t)$ itself.

6) The noise floor estimate is given by the root mean square.

Figure 21:
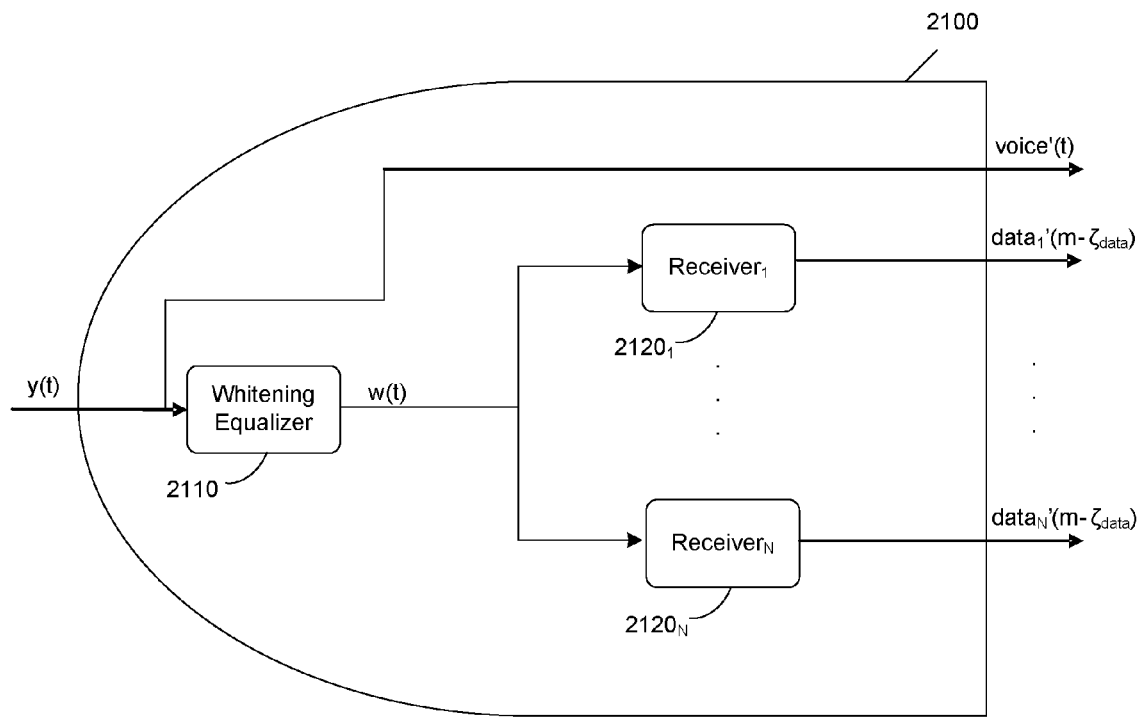
FIG. 21 depicts a block diagram of an exemplary data and voice separator in accordance with various embodiments of the present disclosure.

Reference is now made to FIG. 21 which depicts a block diagram of an exemplary data and voice separator 2100 in accordance with various embodiments of the present disclosure. The data and voice separator 2100 may comprise a whitening equalizer 2110 such as the whitening equalizer 2000 shown in FIG. 2000 and described above. The data and voice separator 2100 may comprise N receivers (collectively referred to as receivers 2120), which may comprise an Audibly White Demodulator 1200 of FIG. 12. Thus, each receiver 2120 may comprise a Low Buzz CDMA chip sequence generator, such as the Low Buzz CDMA chip sequence generator 800 of FIG. 8, and each receiver 2120 may further comprise a spreading decoder, such as the spreading decoder 500 of FIG. 5. In some embodiments, the receivers 2120 may share certain components, such as a PSK demodulator and phase de-randomizer; in other embodiments, each receiver may comprise a separate PSK demodulator and phase de-randomizer.

The output of the data and voice separator 2100 includes an estimate of the voice(t), which is denoted as voice'(t), and an estimate of data(m) for each receiver 2120 (corresponding to each incoming data signal), which is denoted as $data_1'(m - \zeta_{data})$ through $data_N'(m - \zeta_{data})$. Accordingly, the data and voice separator 2100 is operable to reconstruct multiple data signals which have been sent by multiple transmitters.

Figure 22:
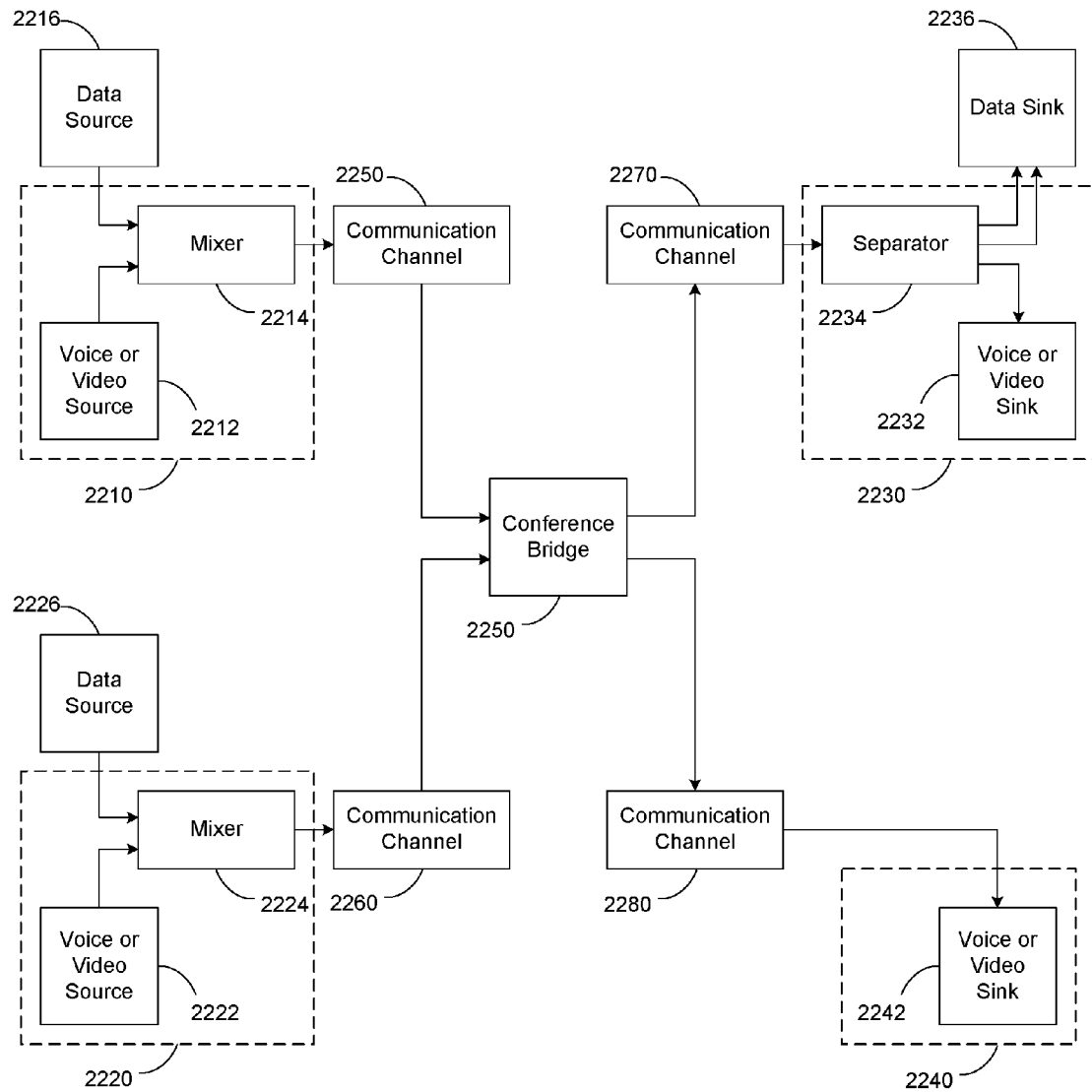
FIG. 22 depicts a block diagram of an exemplary conferencing system in accordance with various embodiments of the present disclosure.

The above-described modules and devices may be embodied in hardware, software, firmware, or a combination thereof. Various embodiments of the present disclosure may find useful application in the fields of audio conferencing and video conferencing. Reference is now made to FIG. 22 which depicts a block diagram of an exemplary conferencing system in accordance with various embodiments of the present disclosure. In accordance with various embodiments of the present disclosure, the conferencing system may provide for multipoint conferencing, i.e., conferencing among three or more endpoints. As well, the conferencing system may provide for point-to-point conferencing, i.e., conferencing between two endpoints.

The conferencing system comprises a plurality of conference endpoints such as speakerphones or other audio conferencing units, video conferencing units, and other terminal devices. In the present example, there are shown four endpoints 2210, 2220, 2230, and 2240. The endpoints can be communicably coupled with each other via a network of communication channels 2250, 2260, 2270, and 2280. The communication channels 2250, 2260, 2270, and 2280 may comprise wired or wireless channels, or both. For example, in some embodiments, any of the communication channels may comprise a telephone channel such as a POTS (Plain Old Telephone Service) channel; a radio channel such as a cellular channel; or any other channel containing an analog section of unknown gain. In one embodiment, one or more of the communication channels 2250, 2260, 2270, and 2280 operate under a standard such as G.711.

The conferencing system may further comprise a conference bridge 2290 used for multipoint conferencing. The conference bridge 2290 may be communicably coupled to each of the endpoints 2210, 2220, 2230, and 2240 via the communication channels 2250, 2260, 2270, and 2280, respectively.

Endpoints 2210, 2220, 2230, and 2240 may comprise, for example, speakerphones, each comprising one or more microphones and one or more speakers. Endpoints 2210, 2220, 2230, and 2240 may generally comprise any audio conferencing unit, video conferencing unit, or other terminal device capable of sending and receiving analog voice signals. For ease of understanding, endpoints 2210 and 2220 are described below in the context of transmitting, while endpoints 2230 and 2240 are described in the context of receiving. It should be understood, however, that each endpoint 2210, 2220, 2230, and 2240 may be capable of both transmitting and receiving voice signals.

Endpoint 2210 may comprise a voice source 2212. Endpoint 2210 may further comprise a data and voice mixer 2214 operable to embed data in a voice signal. The data and voice mixer 2214 may be embodied as a machine-readable medium having thereon a program executable by a processor in the endpoint 2210. In some embodiments, the data and voice mixer 2214 may be separate from the endpoint 2210. For example, the data and voice mixer 2214 may be embodied in a separate modem device. The data and voice mixer 2214 may include features such as those described in connection with FIGS. 1 and 13 above. A data source 2216 may provide an input to the data and voice mixer 2214. In some embodiments, the data source 2216 may comprise a separate device, such as, for example, a computer (e.g., desktop, laptop, or handheld, etc.), a personal data assistant (PDA), a projector, a video camera, a Bluetooth® whiteboard, or other device capable of providing data. In some embodiments, the data source 2216 may be embodied in the endpoint 2210.

Similarly, endpoint 2220 may comprise a voice source 2222. Endpoint 2220 may further comprise a data and voice mixer 2224 operable to embed data in a voice signal. The data and voice mixer 2224 may be embodied as a machine-readable medium having thereon a program executable by a processor in the endpoint 2220. In some embodiments, the data and voice mixer 2224 may be separate from the endpoint 2220. For example, the data and voice mixer 2224 may be embodied in a separate modem device. The data and voice mixer 2224 may include features such as those shown in FIG. 1 or FIG. 13 and as described above. A data source 2226 may provide an input to the data and voice mixer 2224. In some embodiments, the data source 2226 may comprise a separate device, such as, for example, a computer (e.g., desktop, laptop, or handheld, etc.), a personal data assistant (PDA), a projector, a video camera, a Bluetooth® whiteboard, or other device capable of providing data. In some embodiments, the data source 2226 may be embodied in the endpoint 2220.

Endpoint 2230 may comprise a voice sink 2232. Endpoint 2230 may further comprise a data and voice separator 2234. The data and voice separator 2234 may be embodied as a machine-readable medium having thereon a program executable by a processor in the endpoint 2230. In some embodiments, the data and voice separator 2234 may be separate from the endpoint 2220. For example, the data and voice separator 2234 may be embodied in a separate modem device. The data and voice separator 2234 may include features such as those shown in FIG. 21 and described above. The data and voice separator 2234 may provide one or more data inputs to data sink 2236. In some embodiments, more than one data input to data sink 2236 may comprise more than one physical data connection (e.g., cables, memory locations, or multiple data buses, etc.) to distinguish each of the data inputs from each other. In some embodiments, more than one data input to data sink 2236 may comprise only one physical data connection using logical means to distinguish each of the inputs from each other (e.g., Internet Protocol, addressable data bus, or multiplexing, etc.). An example for the purpose of providing more than one data input to data sink 2236 is so that the data and voice separator 2234 may distinguish the data originating from endpoint 2210 and the data originating from endpoint 2220 as two separable inputs to the data sink 2236. In some embodiments, the data sink 2236 may comprise a separate device, such as, for example, a computer (e.g., desktop, laptop, or handheld, etc.), a personal digital assistant (PDA), a display device, or other device capable of receiving data. In some embodiments, the data sink 2236 may comprise multiple devices, such as a device for each data signal. In some embodiments, the data sink 2236 may be embodied in the endpoint 2230. In such embodiments, for example, the data may comprise control data for controlling the endpoint 2230.

Endpoint 2240 may comprise a voice sink 2242. In the present example, endpoint 2240 may not include a data and voice separator or a data sink. Accordingly, the received signal of mixed data and voice can still be branched into a signal and reproduced as sound by the endpoint 2240. To the voice sink 2242, the received signal is treated as a voice signal, and the data is ignored. For conference participants using endpoint 2240, the embedded data may be ignored because the sound of the data may be substantially humanly imperceptible or may sound like white noise, in accordance with various embodiments of the present disclosure.

The embedded data may comprise any of a variety of types of data, such as, for example, text, contact information, presentation information, or control commands for a remote device, etc. The data can be used by the audio or video conference equipment to automate many routine tasks, such as, for example, exchanging parties' phone numbers and names, etc.; or remotely control related equipment, e.g., adding a video portion of the conference call to make it a video conference call or transmitting a web address of a web site of interest.

The data embedded in the audio may also be used as a means for intellectual property rights management, including copyright protection. For example, a digital watermark may be embedded into audio to form watermarked content, such as watermarked music or speech, for example. The watermark may be used to evidence proof of ownership, control unauthorized access to the content, and trace unauthorized copies of the content.

The foregoing examples are provided as illustrative examples and are not intended to be exhaustive. Other types of data than can be embedded in the audio are within the scope of the invention.

In the current disclosure, speech signal or voice signal generally refers to an audio signal in an audio system, which system is operable to process such audio signal. The speech signal or voice signal is not necessarily human speech. It can be any audio signal or sound. The bit stream or digital data include any digital data embedded in or added to the audio signal.

Furthermore, various features of the present disclosure may be of benefit when used with other types of cover media, such as images and video, etc. For example, data may be embedded in images or video signals, and humanly visible artifacts may be suppressed in order to provide enhanced concealment of the data and improved transparency. Instead of or in addition to an audio and data mixer, a video and data mixer may be provided. Likewise, instead of or in addition to an audio and data separator, a video and data separator may be provided. A video conferencing endpoint may further comprise at least one video camera (functioning as a video source) and at least one display device (functioning as a video sink).

While illustrative embodiments of the invention have been illustrated and described, it will be appreciated that various modifications can be made therein without departing from the spirit and scope of the invention. To the extent that such modifications fall within the scope of the appended claims and their equivalents, they are intended to be covered by this patent.

What is claimed is:

1. A method of exchanging analog signals and a digital data among at least two transmitters and at least one receiver in a teleconferencing system, the method comprising:
   by a first transmitter, generating a first CDMA chip sequence;
   combining a first digital bit stream and the first CDMA chip sequence, to form a first spread spectrum sequence;
   modulating the first spread spectrum sequence onto a first analog signal, to form a first modulated signal;
   transmitting the first modulated signal to the receiver via a first communication channel;
   by a second transmitter, generating a second CDMA chip sequence;
   combining a second digital bit stream and the second CDMA chip sequence, to form a second spread spectrum sequence;
   modulating the second spread spectrum sequence onto a second analog signal, to form a second modulated signal; and
   transmitting the second modulated signal to the receiver via a second communication channel;

wherein the first CDMA chip sequence is different from the second CDMA chip sequence;
wherein generating the first CDMA chip sequence comprises periodically pseudo-randomly selecting the first CDMA chip sequence from one of a plurality of chip sequence generators, and
by the at least one receiver, demodulating a received signal, to produce a demodulated signal;
generating a third CDMA chip sequence;
generating a fourth CDMA chip sequence;
multiplying the demodulated signal by the third CDMA chip sequence, to reconstruct the first digital bit stream; and
multiplying the demodulated signal by the fourth CDMA chip sequence, to reconstruct the second digital bit stream;
wherein the third CDMA chip sequence is different from the fourth CDMA chip sequence.

2. The method of claim 1, wherein the plurality of chip sequence generators comprise at least four Gold chip sequence generators.

3. The method of claim 1, wherein the first CDMA chip sequence is orthogonal to the second CDMA chip sequence.

4. The method of claim 1, wherein the first analog signal comprises an audio signal.

5. The method of claim 1, wherein the first analog signal comprises a video signal.

6. The method of claim 1, wherein the first communication channel comprises a telephone channel.

7. The method of claim 1, wherein the first communication channel comprises a radio channel.

8. A machine-readable medium having embodied thereon a program, the program being executable by a machine to perform the method of any of claim 1.

9. A conferencing endpoint, comprising:
at least one signal source;
a signal and data mixer communicably coupled to the at least one signal source, the signal and data mixer comprising:
a first CDMA chip sequence generator operable to generate a first CDMA chip sequence;
a spreading encoder operable to combine a digital bit stream and the first CDMA chip sequence, to form a first spread spectrum sequence; and
a modulator operable to modulate the spread spectrum sequence onto an analog signal received from the at least one signal source, to form a modulated signal for transmission via a communication channel;
at least one signal sink; and
a signal and data separator communicably coupled to the at least one signal sink, the signal and data separator comprising:
a demodulator operable to demodulate a signal received via the communication channel, to produce a demodulated signal;
a second CDMA chip sequence generator, operable to generate a second CDMA chip sequence;
a third CDMA chip sequence generator, operable to generate a third CDMA chip sequence;
a first spreading decoder operable to multiply the demodulated signal by the second CDMA chip sequence, to reconstruct a first digital bit stream;
a second spreading decoder operable to multiply the demodulated signal by the third CDMA chip sequence, to reconstruct a second digital bit stream; and
wherein the second CDMA chip sequence is different from the third CDMA chip sequence.

10. The endpoint of claim 9, wherein the first CDMA chip sequence is periodically pseudo-randomly selected from one of a plurality of chip sequence generators.

11. The endpoint of claim 10, wherein the plurality of chip sequence generators comprise at least four Gold chip sequence generators.

12. The endpoint of claim 9, wherein the at least one signal source comprises a microphone.

13. The endpoint of claim 9, wherein the at least one signal source comprises a video camera.

14. The endpoint of claim 9, wherein the at least one signal sink comprises a speaker.

15. The endpoint of claim 9, wherein the at least one signal sink comprises a display device.

16. The endpoint of claim 9, wherein the communication channel comprises a Plain Old Telephone System channel.

17. The endpoint of claim 9, wherein the communication channel comprises a radio channel.

18. A conferencing system for exchanging digital data and analog signals among at least three geographically remote endpoints, comprising:
a first endpoint comprising:
a first signal source; and
a first signal and data mixer communicably coupled to the first signal source, the first signal and data mixer comprising:
a first CDMA chip sequence generator operable to generate a first CDMA chip sequence;
a first spreading encoder operable to combine the first CDMA chip sequence and a first digital bit stream provided by a first data source, to form a first spread spectrum sequence; and
a first modulator operable to modulate the first spread spectrum sequence onto a first analog signal received from the first signal source, to form a first modulated signal for transmission to a conference bridge via a first communication channel;
a second endpoint comprising:
a second signal source; and
a second signal and data mixer communicably coupled to the second signal source, the second signal and data mixer comprising:
a second CDMA chip sequence generator operable to generate a second CDMA chip sequence;
a second spreading encoder operable to combine the second CDMA chip sequence and a second digital bit stream provided by a second data source, to form a second spread spectrum sequence; and
a second modulator operable to modulate the second spread spectrum sequence onto a second analog signal received from the second signal source, to form a second modulated signal for transmission to the conference bridge via a second communication channel;
a third endpoint comprising:
at least one signal sink; and
a signal and data separator communicably coupled to the at least one signal sink, the signal and data separator comprising:
a demodulator operable to demodulate a signal received from the bridge via a third communication channel, to produce a demodulated signal;
a third CDMA chip sequence generator, operable to generate a third CDMA chip sequence;

a fourth CDMA chip sequence generator, operable to generate a fourth CDMA chip sequence;

a first spreading decoder operable to multiply the demodulated signal by the third CDMA chip sequence, to reconstruct the first digital bit stream; and a second spreading decoder operable to multiply the demodulated signal by the fourth CDMA chip sequence, to reconstruct the second digital bit stream;

wherein the third CDMA chip sequence is different from the fourth CDMA chip sequence.

19. The system of claim 18, wherein the first CDMA chip sequence is periodically pseudo-randomly selected from one of a plurality of chip sequence generators.

20. The system of claim 19, wherein the plurality of chip sequence generators comprise at least four Gold chip sequence generators.

21. The system of claim 18, wherein the first signal source comprises a microphone.

22. The system of claim 18, wherein the first signal source comprises a video camera.

23. The system of claim 18, wherein the first signal sink comprises a speaker.

24. The system of claim 18, wherein the first signal sink comprises a display device.

25. The system of claim 18, wherein the first communication channel comprises a Plain Old Telephone System channel.

26. The system of claim 18, wherein the first communication channel comprises a radio channel.

27. The method of claim 1, wherein each of the plurality of sequence generators has a different initialization point.

28. The endpoint of claim 10, wherein each of the plurality of sequence generators has a different initialization point.

29. The system of claim 19, wherein each of the plurality of sequence generators has a different initialization point.

* * * * *